US010710660B2

(12) United States Patent
Dubb

(10) Patent No.: US 10,710,660 B2
(45) Date of Patent: *Jul. 14, 2020

(54) PANNIER SYSTEM

(71) Applicant: Abraham Samuel Dubb, Philadelphia, PA (US)

(72) Inventor: Abraham Samuel Dubb, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/977,459

(22) Filed: May 11, 2018

(65) Prior Publication Data

US 2019/0344852 A1    Nov. 14, 2019

(51) Int. Cl.
*B62J 9/00* (2020.01)
*B65D 5/46* (2006.01)
*B65D 5/66* (2006.01)
*B65D 5/32* (2006.01)
*B65D 5/42* (2006.01)

(52) U.S. Cl.
CPC .............. *B62J 9/00* (2013.01); *B65D 5/321* (2013.01); *B65D 5/4266* (2013.01); *B65D 5/46* (2013.01); *B65D 5/66* (2013.01)

(58) Field of Classification Search
CPC .......... B62J 9/001; B62J 9/00; B65D 5/4266; B65D 5/66; B65D 5/321; B65D 5/46
USPC ................................. 224/430, 432
See application file for complete search history.

(56) References Cited

U.S. PATENT DOCUMENTS

| | | | | |
|---|---|---|---|---|
| 1,820,523 A | * | 8/1931 | Augustin | B65D 5/0281 229/104 |
| 1,963,333 A | * | 6/1934 | Morales | B62J 9/00 224/422 |
| 2,625,315 A | * | 1/1953 | Fehrenkamp | B65D 5/106 229/155 |
| 2,686,002 A | * | 8/1954 | Inman | B65D 5/3621 229/114 |
| 2,903,180 A | * | 9/1959 | Holmes | B65D 5/542 229/212 |

(Continued)

FOREIGN PATENT DOCUMENTS

| | | | | |
|---|---|---|---|---|
| DE | 202017005234 U1 | * | 10/2017 | B62J 9/001 |
| DE | 202017005234 U1 | | 10/2017 | |

OTHER PUBLICATIONS

International Search Report and Written Opinion for Application No. PCT/US2018/032302, dated Jul. 20, 2018. 9 pages.

(Continued)

*Primary Examiner* — Nathan J Newhouse
*Assistant Examiner* — Lester L Vanterpool
(74) *Attorney, Agent, or Firm* — McCarter & English LLP; Vadim E. Cherkasov

(57) ABSTRACT

The application discloses a blank configured to be mounted on a bicycle rack. The blank includes a bottom section that forms an item supporting surface when the blank is folded into a folded pannier configuration. The blank includes a lateral face section hingedly connected with the bottom section at a first fold line. The blank includes a central, vertical axis extending between proximal and distal ends of the blank. The blank is adapted to be folded from an unfolded blank configuration into a folded pannier configuration. In the unfolded blank configuration, opposing sides of the blank relative to the central, vertical axis are asymmetrical.

19 Claims, 27 Drawing Sheets

(56) References Cited

U.S. PATENT DOCUMENTS

| | | | | |
|---|---|---|---|---|
| 3,874,574 | A * | 4/1975 | Heise | B62J 9/00 |
| | | | | 224/417 |
| 3,934,770 | A * | 1/1976 | Larsen | B62J 9/00 |
| | | | | 224/429 |
| 3,937,374 | A * | 2/1976 | Hine, Jr. | B62J 9/00 |
| | | | | 224/430 |
| 4,017,019 | A * | 4/1977 | Booth | B65D 5/106 |
| | | | | 229/113 |
| 4,262,829 | A * | 4/1981 | Hine, Jr. | B62J 9/00 |
| | | | | 224/417 |
| 4,295,586 | A * | 10/1981 | Shockley | B62J 9/00 |
| | | | | 224/430 |
| 4,307,834 | A * | 12/1981 | Roccaforte | B65D 5/46096 |
| | | | | 229/117 |
| 4,345,703 | A * | 8/1982 | Allen | B62J 9/00 |
| | | | | 224/417 |
| 4,450,988 | A * | 5/1984 | Meisel | B62J 9/00 |
| | | | | 224/417 |
| 4,580,706 | A * | 4/1986 | Jackson | B62J 9/00 |
| | | | | 224/417 |
| 5,423,478 | A * | 6/1995 | Roosa | B65D 5/46104 |
| | | | | 229/114 |
| 5,437,390 | A * | 8/1995 | Romick | B65D 5/6611 |
| | | | | 206/538 |
| 5,788,066 | A * | 8/1998 | Focke | B65D 85/1045 |
| | | | | 206/268 |
| 5,839,649 | A * | 11/1998 | Clark | B65D 5/008 |
| | | | | 229/114 |
| 5,904,230 | A * | 5/1999 | Peterson | A45C 11/20 |
| | | | | 190/107 |
| 6,213,387 | B1 | 4/2001 | Zinke | |
| 6,843,396 | B2 * | 1/2005 | Champagne | B62J 7/04 |
| | | | | 224/422 |
| 7,325,718 | B2 * | 2/2008 | Cook | B65D 5/008 |
| | | | | 220/826 |
| 7,568,600 | B2 * | 8/2009 | Godshaw | B62J 9/25 |
| | | | | 224/429 |
| 7,597,209 | B2 * | 10/2009 | Rothschild | A45C 7/0036 |
| | | | | 220/23.87 |
| 8,074,852 | B2 * | 12/2011 | Crum, Jr. | B62J 9/20 |
| | | | | 224/432 |
| 8,322,583 | B2 * | 12/2012 | Crum, Jr. | B62J 7/04 |
| | | | | 224/432 |
| 8,479,972 | B2 * | 7/2013 | Craft | B65D 5/029 |
| | | | | 229/101 |
| 8,973,797 | B2 * | 3/2015 | Langlois | B62J 9/20 |
| | | | | 224/432 |
| 2006/0243785 | A1 | 11/2006 | Wang | |
| 2010/0147918 | A1 * | 6/2010 | Hensley | B62J 9/20 |
| | | | | 224/600 |
| 2014/0138417 | A1 | 5/2014 | Langlois | |
| 2016/0198673 | A1 * | 7/2016 | Waid | A01K 1/0125 |
| | | | | 119/167 |
| 2016/0229474 | A1 * | 8/2016 | Carlson | B62J 7/04 |

OTHER PUBLICATIONS

Noe, Rain, Making Sturdy Stuff Out of Plastic Sheets, Part 1: Mail Bins, Core 77, available at http://www.core77.com/posts/19254/Making-Sturdy-Stuff-Out... (May 6, 2011).

Peterson, Kent, Toby's Coroplast Panniers & Fenders, Kent's Bike Blog, available at http://kentsbike.blogspot.com/2007/01/tobys-coroplast-panniers... (Jan. 22, 2007).

MTBR, Frame Bag made from Coroplast, available at http://forums.mtbr.com/bikepacking-bike-expedition/frame-bag-made-coroplast-781618.html (Apr. 13, 2012).

U.S. Appl. No. 15/868,476, filed May 11, 2018, N/A, Pending.

* cited by examiner

PANNIER SYSTEM

BACKGROUND

Bicycle panniers are generally mounted on a rack of a bicycle and used for storage of various items of the rider. Traditional panniers are generally made from a woven material that may be costly to fabricate or replace. Due to the woven construction of traditional panniers, the configuration of such panniers cannot be customized based on the size and/or shape of the rider's bicycle.

SUMMARY

The disclosure relates to a pannier system including two pannier blanks that can be folded and engaged with each other over a rack on a bicycle. Each pannier blank can be fabricated from a cost-effective material, such as corrugated plastic board, corrugated cardboard, or the like. Each pannier can therefore be easily collapsed for storage, and cheap to replace if damage to the pannier occurs. Although the general panels and fold lines are maintained for different configurations of the panniers, the shape and/or dimensions of the panels and fold lines can be adjusted to customize the pannier system for bicycles of different sizes and/or to accommodate the enclosure of the pannier system for items of different sizes. A convenient and easily replaceable pannier system is therefore provided.

In accordance with some embodiments of the present disclosure, an exemplary blank for a collapsible, folded pannier is provided. The blank includes a bottom section that forms an item supporting surface when the blank is folded into the folded pannier configuration. The blank includes a lateral face section hingedly connected with the bottom section at a first fold line. The blank includes a medial face section hingedly connected with the bottom section at a second fold line. The blank is adapted to be folded into a folded pannier configuration, and subsequently capable of being unfolded into an unfolded blank configuration.

In the unfolded blank configuration, the blank can define a substantially flat and planar structure having a uniform thickness. In the folded pannier configuration, the blank can be configured to be mounted on a rack of a bicycle. The blank includes a central, vertical axis extending between proximal and distal ends of the blank. The bottom section, lateral face section, and medial face sections can extend substantially in-line with the central, vertical axis. The first and second fold lines can extend substantially perpendicularly to the central, vertical axis.

In the folded pannier configuration, the bottom section, the lateral face section, and the medial face section can define an enclosure configured to receive therein one or more items. The blank includes a lid section hingedly connected with the lateral face section at a third fold line. In some embodiments, the blank can include a clearance section hingedly connecting the lid section with the lateral face section. The blank includes first and second overhang sections hingedly connected to lateral sides of the lid section at fourth and fifth fold lines. The fourth and fifth fold lines can extend substantially parallel to a central, vertical axis of the blank.

The blank includes first and second arm face sections hingedly connected to the lateral face section at sixth and seventh fold lines. In some embodiments, the first and second arm face sections can each define a substantially L-shaped configuration. The blank includes a rack face section hingedly connected to the medial face section at an eighth fold line. The eighth fold line can extend substantially perpendicularly to the central, vertical axis of the blank. The blank includes first and second rack tabs hingedly connected to lateral sides of the rack face section at ninth and tenth fold lines. The ninth and tenth fold lines can extend substantially parallel to the central, vertical axis of the blank.

In accordance with embodiments of the present disclosure, an exemplary collapsible, folded pannier system is provided. The pannier system includes a first pannier, and a second pannier engaged with the first pannier. Each of the first and second panniers includes a bottom section that forms an item supporting surface of the first and second panniers in a folded pannier configuration, a lateral face section hingedly connected with the bottom section at a first fold line, and a medial face section hingedly connected with the bottom section at a second fold line. Each of the first and second panniers can be adapted to be folded into a folded pannier configuration, and subsequently capable of being unfolded into an unfolded configuration.

In the unfolded configuration, each of the first and second panniers can define a substantially flat and planar structure having a uniform thickness. The lateral face sections of the first and second panniers can be spaced to form a passage configured to receive therein a bicycle rack. Each of the first and second panniers includes a lid section hingedly connected with the lateral face section at a third fold line.

In some embodiments, the pannier system includes complementary attachment mechanisms secured to the lid section of the first and second panniers. The attachment mechanisms can be configured to releasably engage the lid sections with each other. In some embodiments, the pannier system includes a handle mounted to the lid section of the first pannier and a complementary cutout formed in the lid section of the second pannier. The handle can be configured to engage with the cutout to releasably engage the lid sections with each other.

In accordance with embodiments of the present disclosure, an exemplary method of forming a blank for a collapsible, folded pannier is provided. The method includes providing a blank defining a substantially flat configuration. The method includes forming a bottom section in the blank. The bottom section forms an item supporting surface when the blank is folded into a folded pannier configuration. The method includes forming a lateral face section in the blank, and forming a first fold line in the blank between the bottom section and the lateral face section. The method includes forming a medial face section in the blank, and forming a second fold line in the blank between the bottom section and the medial face section. The blank can be adapted to be folded into the folded pannier configuration, and subsequently capable of being unfolded into an unfolded blank configuration.

In accordance with embodiments of the present disclosure, an exemplary blank for a collapsible, folded pannier and methods of forming the exemplary blank are provided. The blank includes a bottom section that forms an item supporting surface when the blank is folded into a folded pannier configuration. The blank includes a lateral face section hingedly connected with the bottom section at a first fold line. The blank includes a central, vertical axis extending between proximal and distal ends of the blank. The blank is adapted to be folded from an unfolded blank configuration into a folded pannier configuration. In the unfolded blank configuration, opposing sides of the blank relative to the central, vertical axis are asymmetrical.

The blank includes a lid section hingedly connected with the lateral face section at a second fold line. The second fold line extends at a non-perpendicular angle relative to the central, vertical axis. In the folded pannier configuration, the lid section is angled downwardly from one side to an opposing side of the pannier. In some embodiments, an angle of the lid section relative to horizontal is from about 5° and about 60°.

The first fold line extends at a non-perpendicular angle relative to the central, vertical axis. In the folded pannier configuration, the lateral face section is angled such that a width of the pannier at one end is dimensioned greater than a width of the pannier at an opposing end. The blank includes a medial face section hingedly connected with the bottom section at a third fold line. The lateral face section and the medial face section each include an opening extending therethrough, the openings configured to substantially align in the folded pannier configuration. The blank includes a tube extending through the openings between the lateral face section and the medial face section, the tube configured to mitigate crosswinds against the pannier. In the unfolded blank configuration, the blank defines a flat and planar structure. The blank includes first and second arm face sections hingedly connected to the lateral face section at fourth and fifth fold lines, the fourth and fifth fold lines extending at an angle relative to the central, vertical axis.

In accordance with embodiments of the present disclosure, an exemplary pannier is provided. The pannier includes a bottom section that forms an item supporting surface of the pannier, a lateral face section hingedly connected with the bottom section at a first fold line, a medial face section hingedly connected with the bottom section at a second fold line, and a lid section hingedly connected with the lateral face section at a third fold line. The lid section extends at an angle relative to the bottom face section.

One end of the lateral face section defines a height dimensioned greater than a height at an opposing end of the lateral face section. The pannier is formed from a blank adapted to be unfolded from a folded pannier configuration into an unfolded blank configuration. In the unfolded blank configuration, opposing sides of the blank relative to a central, vertical axis are asymmetrical. The lateral face section tapers inwardly relative to the medial face section between one end of the pannier and an opposing end of the pannier. In some embodiments, a tube extends through openings between the lateral face section and the medial face section, the tube configured to mitigate crosswinds against the pannier. The pannier includes first and second arm face sections hingedly connected to the lateral face section at fourth and fifth fold lines, a surface area of the second arm face section dimensioned smaller than a surface area of the first arm face section.

In accordance with embodiments of the present disclosure, an exemplary collapsible, folded pannier system is provided. The pannier system includes a first pannier and a second pannier engaged with the first pannier. Each of the first and second panniers includes a bottom section that forms an item supporting surface of the first and second panniers in a folded pannier configuration, a lateral face section hingedly connected with the bottom section at a first fold line, and a central, vertical axis extending between proximal and distal ends of the first and second panniers in an unfolded blank configuration. In the unfolded blank configuration, opposing sides of the first and second panniers relative to the central, vertical axis are asymmetrical.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed pannier system, reference is made to the accompanying figures, wherein.

DETAILED DESCRIPTION

Figure 1:
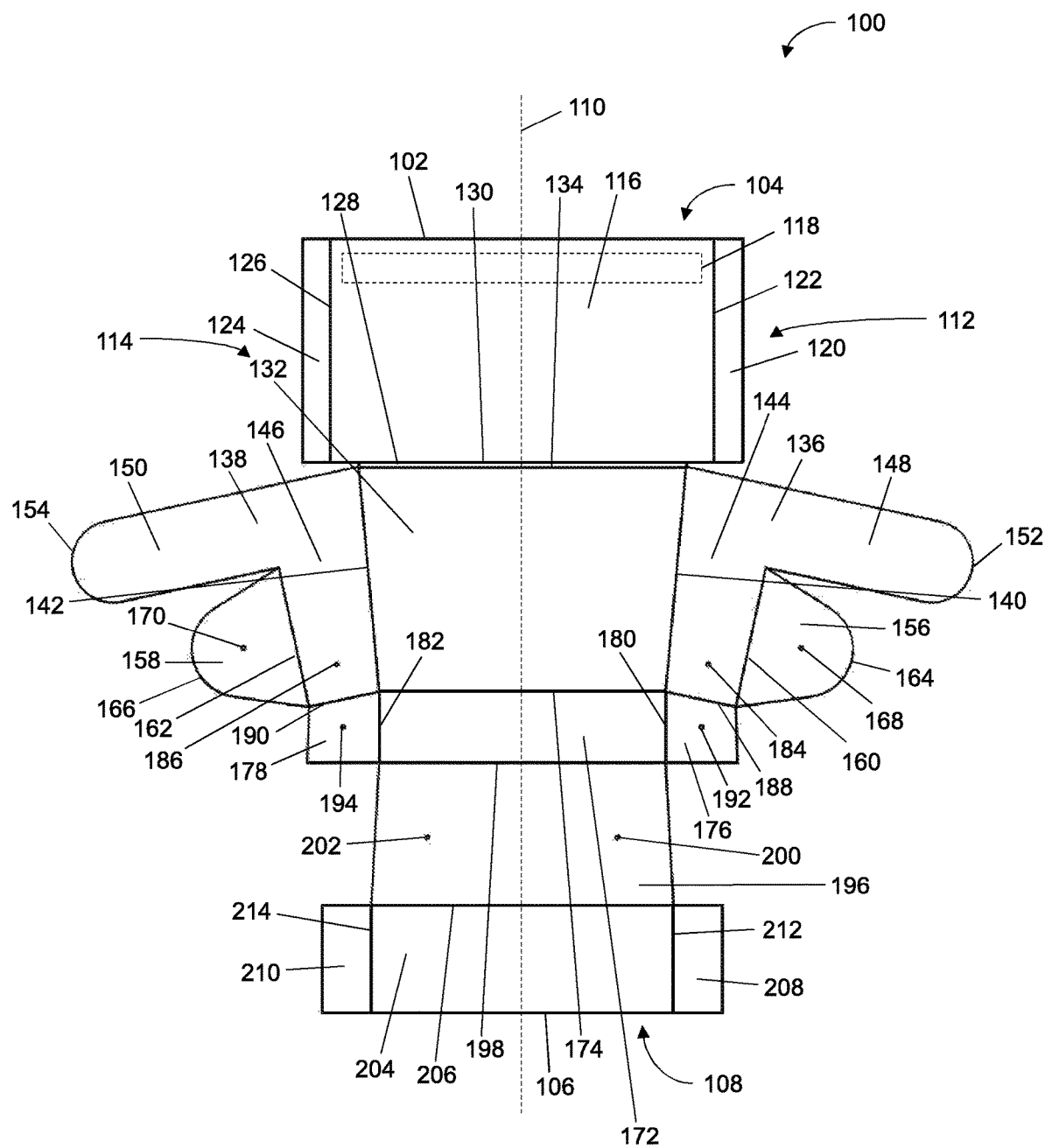
FIG. 1 is a top view of an exemplary pannier blank of the present disclosure in an unfolded configuration.
Figure 2:
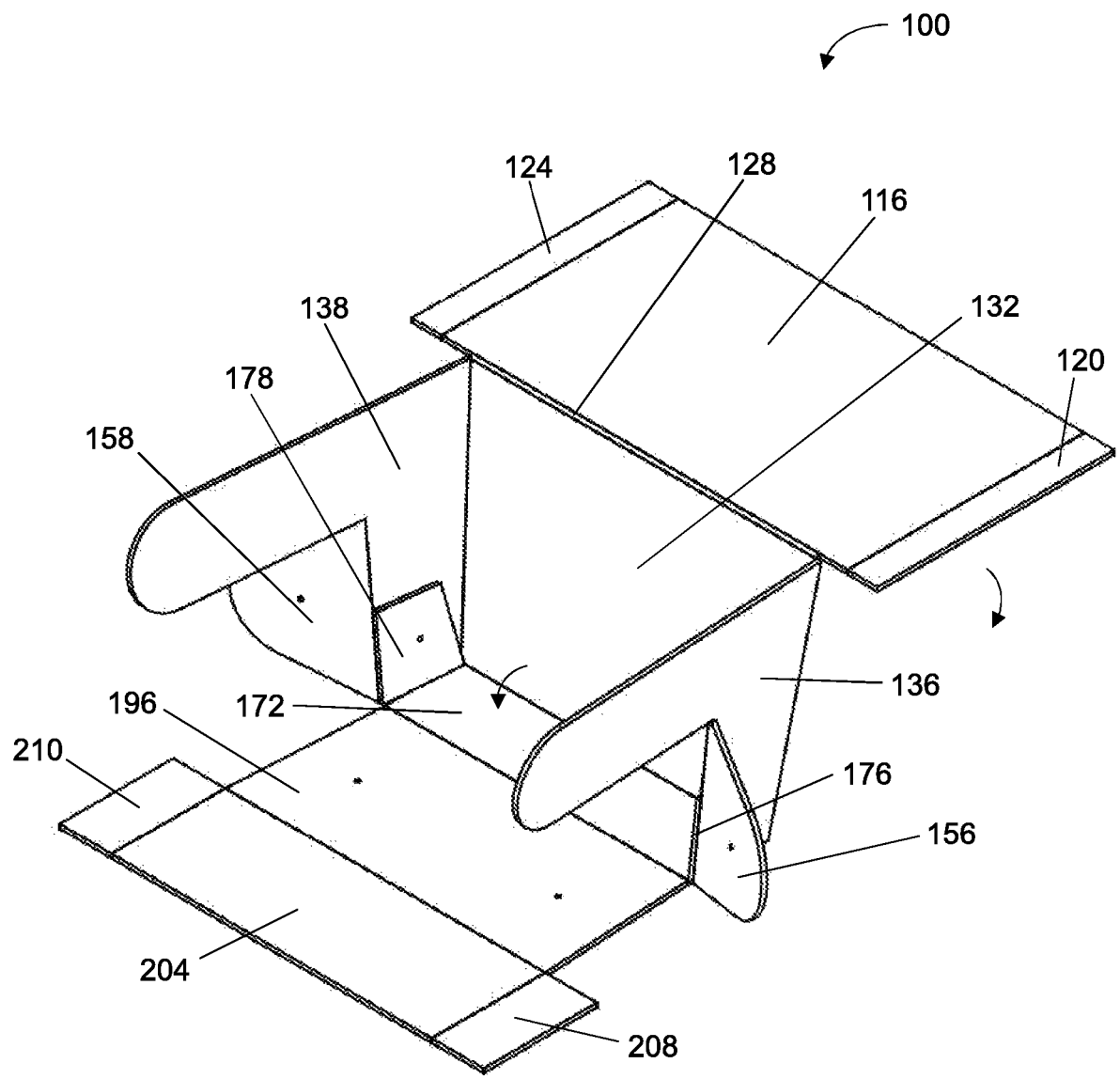
FIG. 2 is a perspective view of an exemplary pannier blank of the present disclosure in a partially folded configuration.
Figure 3:
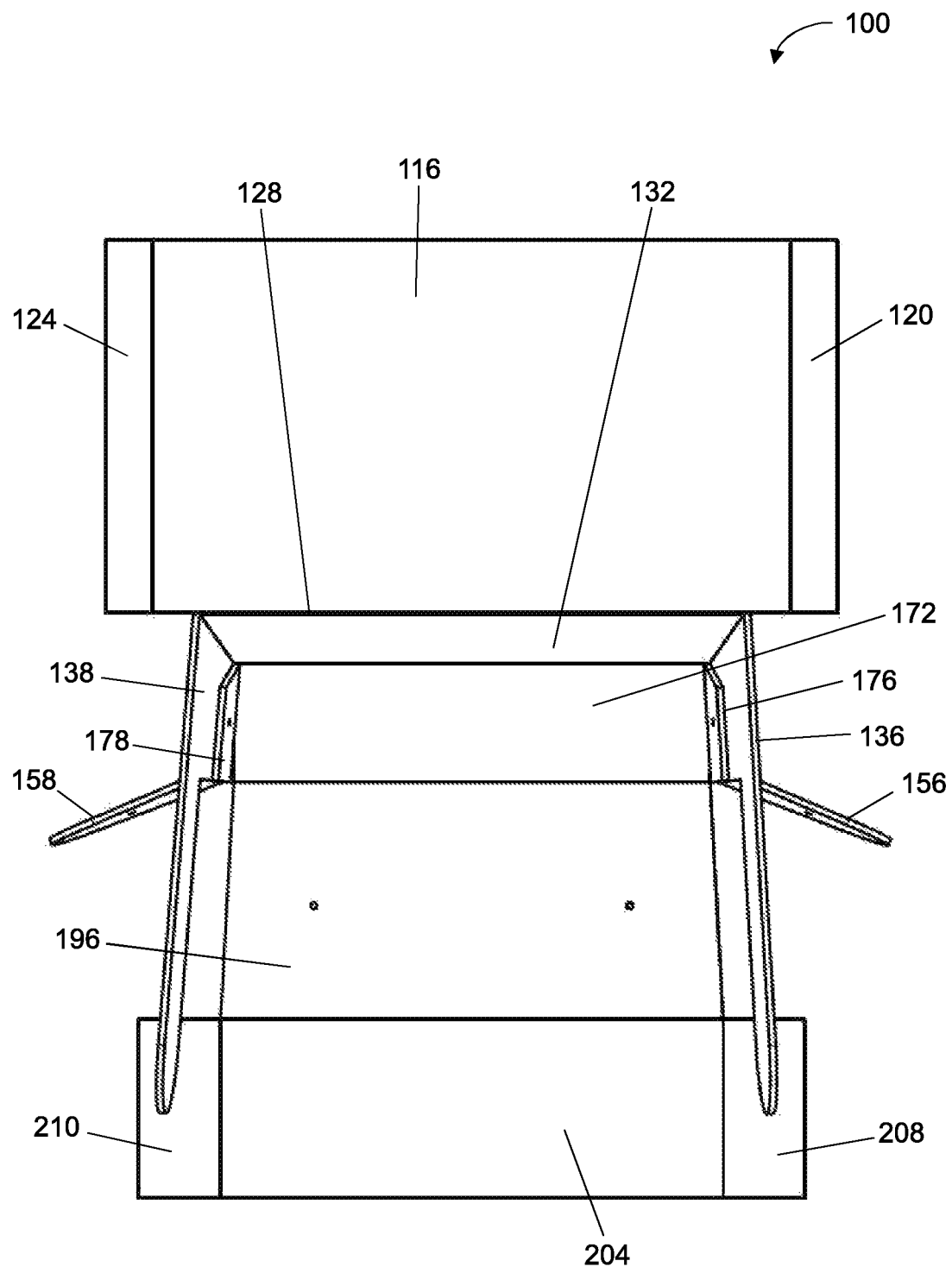
FIG. 3 is a top view of an exemplary pannier blank of FIG. 2.
Figure 4:
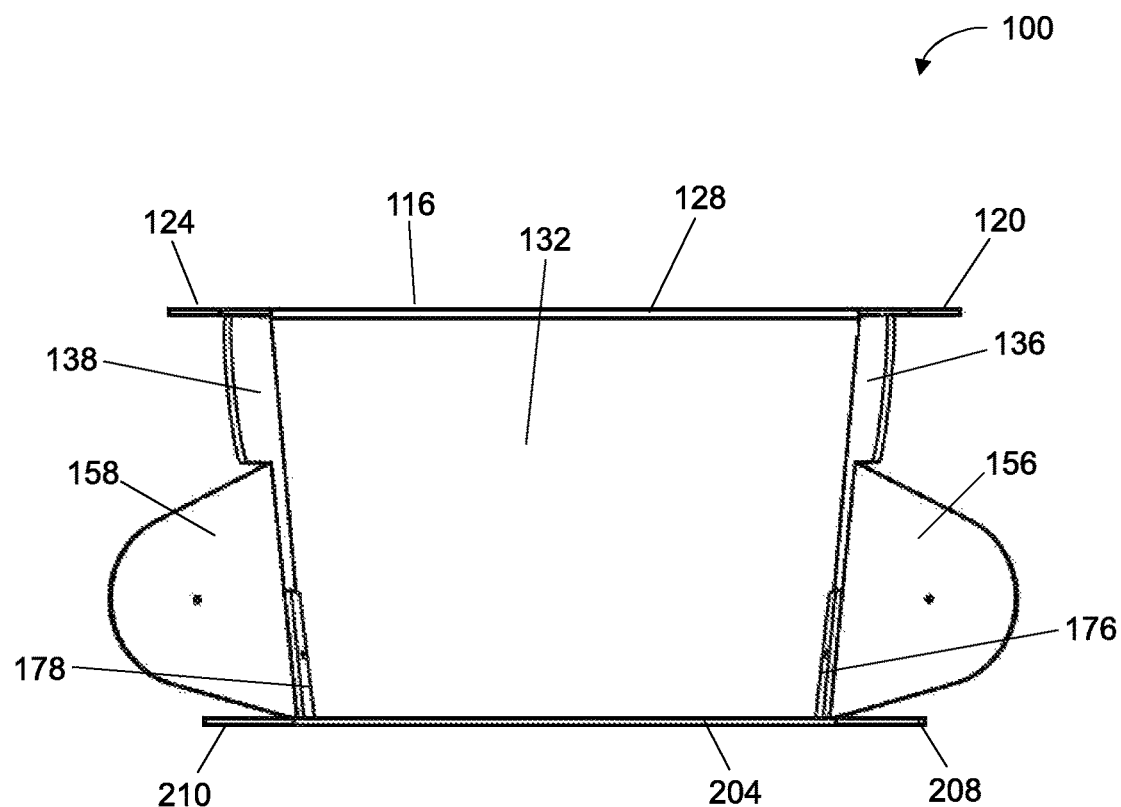
FIG. 4 side view of an exemplary pannier blank of FIG. 2.
Figure 5:
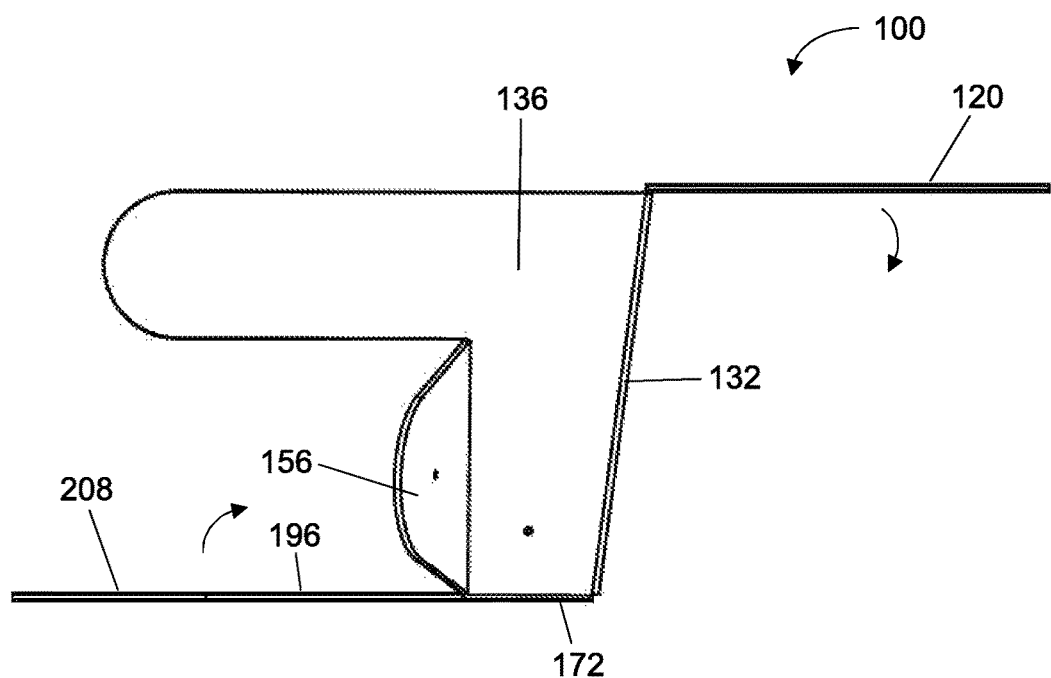
FIG. 5 is a front view of an exemplary pannier blank of FIG. 2.
Figure 6:
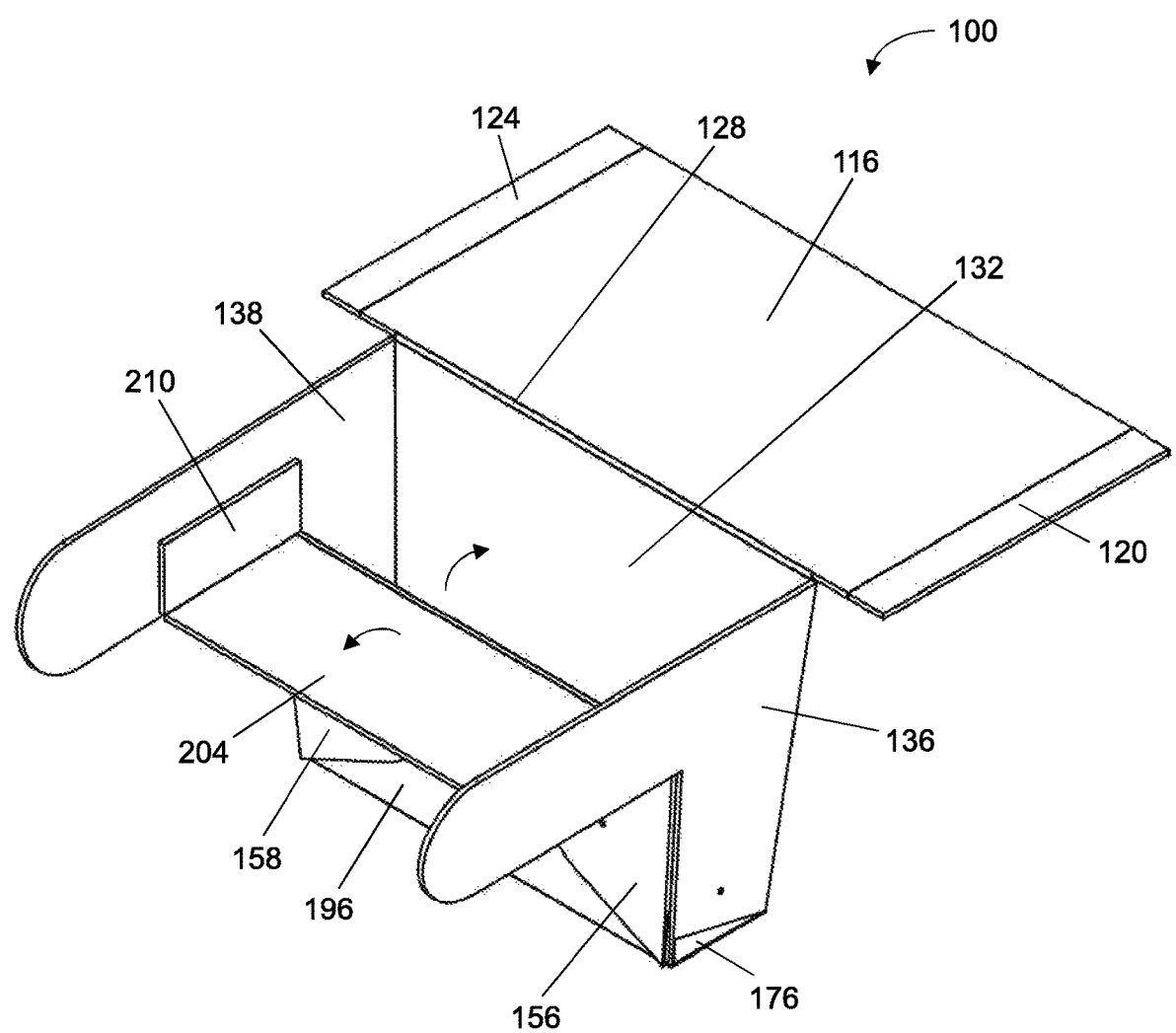
FIG. 6 is a perspective view of an exemplary pannier blank of the present disclosure in a partially folded configuration.
Figure 7:
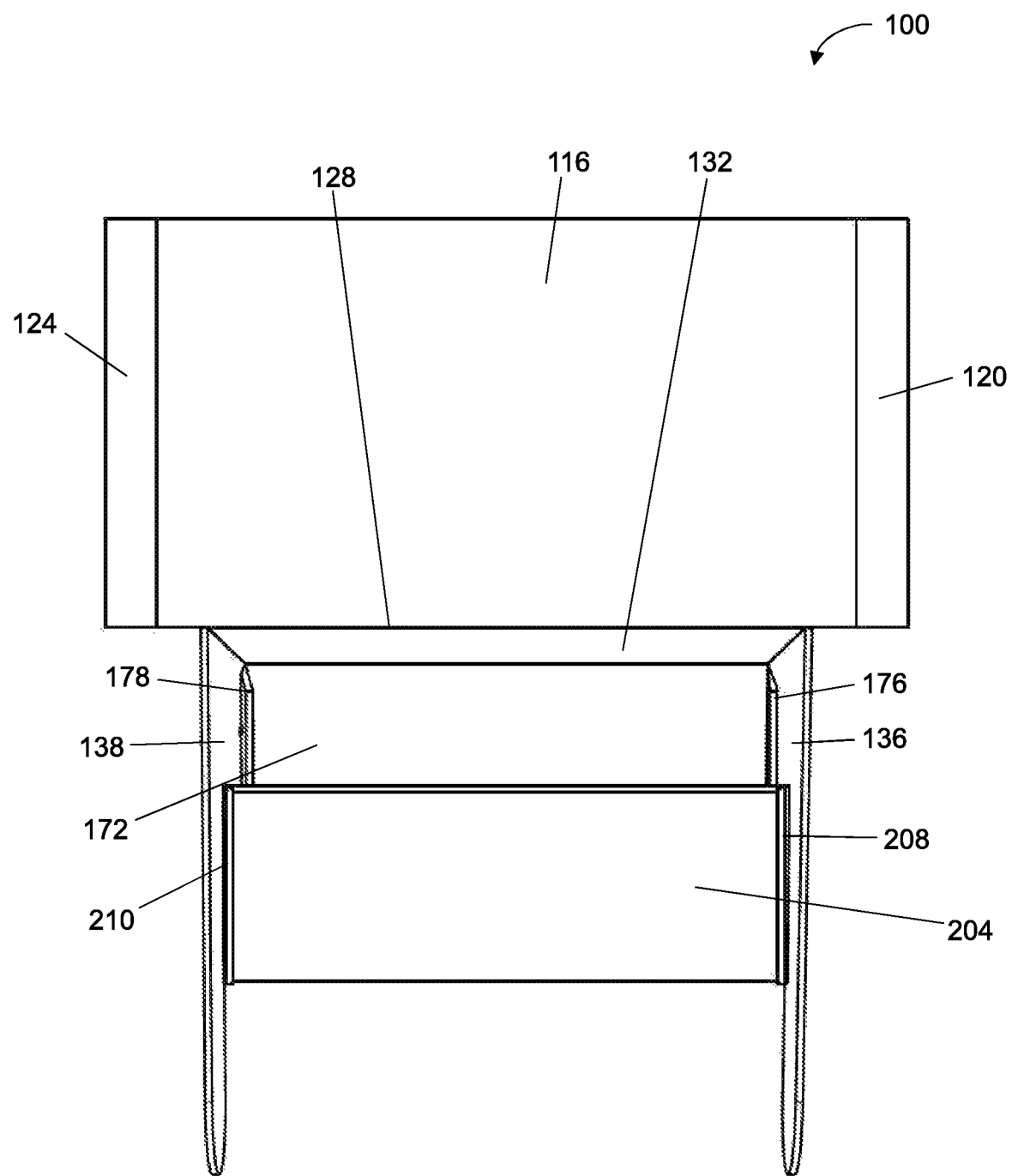
FIG. 7 is a top view of an exemplary pannier blank of FIG. 6.
Figure 8:
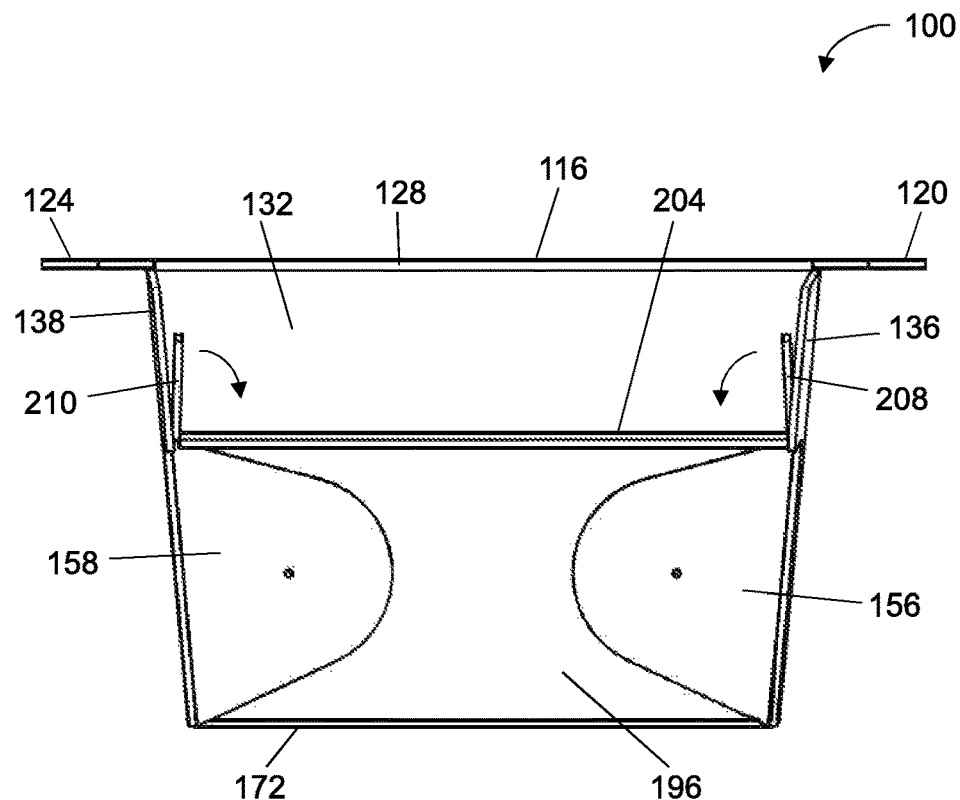
FIG. 8 is a side view of an exemplary pannier blank of FIG. 6.
Figure 9:
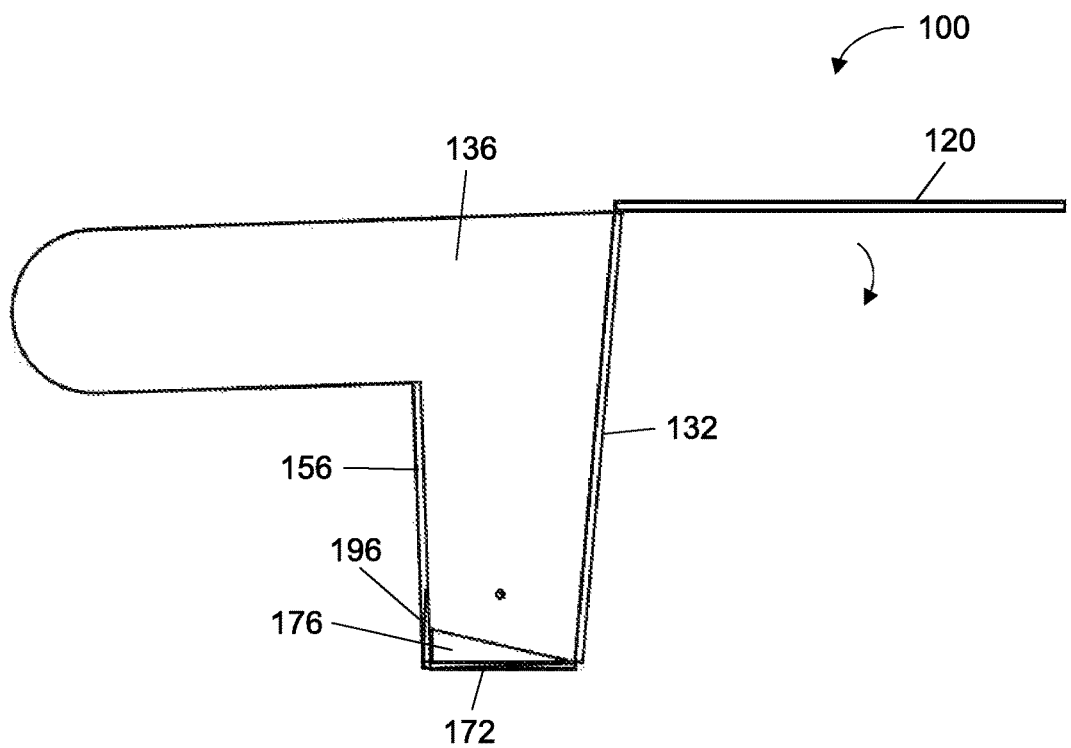
FIG. 9 is a front view of an exemplary pannier blank of FIG. 6.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g., 3, 4, or 5.

The term "plurality" as used herein is defined as any amount or number greater or more than 1. In some embodiments, the term "plurality" means 2, 3, 4, 5, 6 or more.

The terms "left" or "right" are used herein as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes.

The terms "substantially horizontal" or "substantially vertical" are used herein when referring to a relationship relative to a horizontal axis or plane or a vertical axis or plane, respectively. In some embodiments, "substantially horizontal" refers to equal to 0° from horizontal, or ±10°, ±5°, ±1°, ±0.5°, ±0.4°, ±0.3°, ±0.2°, ±0.1°, ±0.09°, ±0.08°, ±0.07°, ±0.06°, ±0.05°, ±0.04°, ±0.03°, ±0.02° or ±0.01° from horizontal. In some embodiments, "substantially vertical" refers to equal to 0° from vertical (e.g., a vertical plane perpendicular to horizontal), or ±10°, ±5°, ±1°, ±0.5°, ±0.4°, ±0.3°, ±0.2°, ±0.1°, ±0.09°, ±0.08°, ±0.07°, ±0.06°, ±0.05°, ±0.04°, ±0.03°, ±0.02° or ±0.01° from vertical.

The term "about" or "approximately" as used herein when referring to a measurable value such as an amount, a temporal duration, and the like, is meant to encompass variations of ±20%, ±10%, ±5%, ±1%, ±0.5%, ±0.4%, ±0.3%, ±0.2%, ±0.1%, ±0.09%, ±0.08%, ±0.07%, ±0.06%, ±0.05%, ±0.04%, ±0.03%, ±0.02% or ±0.01% from the specified value, as such variations are appropriate to perform the disclosed methods.

The term "blank" as used herein is defined as any material forming a substantially flat structure with components or flaps that can be folded to define a formed structure, e.g., a pannier. In some embodiments, the term "blank" as used herein can include any formed material that has been cut or punched out of a substantially flat piece of material, such as corrugated plastic board or corrugated cardboard. It should be understood that the material of the blank can be selected such that in the folded, pannier configuration, the material provides sufficient support for the items being stored in the pannier and prevents damage to such items during riding of the bicycle, while allowing the blank to be conveniently collapsed into the unfolded configuration. In some embodiments, the material of the blank can be selected to have a surface coating or layer that provides resistance to moisture (e.g., a waterproof or water resistant layer). In some embodiments, the material of the blank can be selected to have a metallic outer layer or coating to provide additional strength and security. The blank can be substantially flat in the unfolded configuration and can define a thickness suitable for providing the requisite support for the items when in the folded, pannier configuration.

The term "folded" or "substantially folded" as used herein is defined as one or more portions of the blank being moved to be placed adjacent to or closer to another portion of the blank, or rotated to a different angle relative to another portion of the blank.

The terms "collapse", "collapsible" or "collapsibly" as used herein is defined as any amount of unfolding or separation of portions of the blank from the fully folded, pannier configuration. Such terms can be interchangeably used herein. For example, collapsing the fully folded pannier can involve unfolding and/or or separating one or more portions from each other. As a further example, collapsing the fully folded pannier can involve unfolding and/or separating the portions of the pannier until a substantially flat, unfolded blank is achieved.

The term "align" or "substantially align" as used herein is defined as placement adjacent to or substantially parallel to another element. In some embodiments, aligning or substantially aligning includes placement of two elements from about 0 inches to about 0.25 inches relative to each other.

The term "hingedly" as used herein refers to two components being physically and operably connected to one another at one or more portions between the interconnected components. In some embodiments, "hingedly" refers to connection of a flap to another component of the blank at a fold line.

The exemplary blanks discussed herein include a plurality of fold lines such that the blanks can be folded into a folded configuration for mounting to a bicycle rack and transporting or storing items, and subsequently unfolded into an unfolded (e.g., collapsed) configuration for storage. The exemplary blanks can initially define a substantially flat configuration convenient for shipping the blank as a pannier system kit prior to folding into the folded configuration. The fold lines allow for the sections, flaps and/or tabs of the blank to be hingedly connected relative to each other for folding of the blank into the folded pannier configuration. It should be understood that the flaps/tabs of the exemplary blanks are integrally formed out of a single or unitary piece of material, such that the single blank can be folded into the exemplary pannier. It should further be understood that the exemplary fold lines discussed herein can be added in a variety of configurations to permit the blanks to be folded into the pannier configuration. In some embodiments, the fold lines can be formed as continuous, partial depth cuts in the blank to provide for convenient, guided folding at the appropriate areas. In some embodiments, the fold lines can be formed as a perforated line. In some embodiments, the fold lines can be formed on a plastic blank with the use of a strip heater. In some embodiments, the folds can be formed on a sheet metal blank with the use of a metal break.

In some embodiments, the blanks can include one or more openings formed therein, and rivets (or any other fastener) can be used to detachably secure one or more flaps/sections of the blank to each other. In some embodiments, one or more flaps/sections of the blank can be secured to each other using, e.g., VELCRO™, glue, screws, tape, ultrasonic weld, blind rivets, sex bolts, or the like. Although not shown, in some embodiments, a strap can be secured to the blank in the folded configuration for transport of the folded pannier. In some embodiments, the folded pannier can include VELCRO™ or any other attachment structure for maintaining the lid in a closed position.

FIG. 1 is a top view of an exemplary pannier blank 100 in an unfolded, substantially flat configuration. The flat and planar configuration of the blank 100 in the unfolded configuration can define a substantially uniform thickness. For reference, a top edge 102 of the blank 100 defines a proximal end 104 and a bottom edge 106 defines a distal end 108 of the blank 100. A central, vertical axis 110 extends between the proximal and distal ends 104, 108. For reference, the lateral side of blank 100 on the right side of the axis 110 as viewed from the top can be referred to as the right side 112 of the blank, and the lateral side of the blank 100 on the left side of the axis 110 as viewed from the top can be referred to as the left side 114. The flaps/sections and fold lines on the right and left sides 112, 114 of the axis 110 can be substantially symmetrical. As referred to herein, a length of a component can refer to a distance substantially parallel to the axis 110, and a width of a component can refer to a distance substantially perpendicular to the axis 110.

The blank 100 includes a lid section 116 at the proximal end 104. The lid section 116 can define a substantially rectangular configuration, with one edge being defined by the top edge 102 of the blank 100. In some embodiments, the inner surface of the lid section 116 (the surface facing upwardly in FIG. 1) can include an attachment mechanism 118 (e.g., VELCRO™, or the like) near the top edge 102. The outer, opposing surface of a second blank 100 can include a complementary attachment mechanism 118 such that the lid sections 116 of the two blanks 100 can be releasably engaged when in the folded configuration.

The blank 100 includes a first overhang section 120 (e.g., right side overhang) hingedly connected to the right side of the lid section 116 at a fold line 122. The blank 100 includes a second overhang section 124 (e.g., a left side overhang) hingedly connected to the opposing, left side of the lid section 116 at a fold line 126. The overhang sections 120, 124 can define substantially rectangular configurations, with the fold lines 122, 126 extending substantially parallel to the axis 110. The overhang sections 120, 124 can have a width dimensioned substantially smaller than the width of the lid section 116, and a length substantially equal to the length of the lid section 116. Although exemplary dimensions or dimensional relationships are discussed herein, it should be understood that the dimensions of the flaps can be adjusted based on the configuration of the bicycle on which the pannier is to be mounted. In some embodiments, rather than or in addition to the overhang sections 120, 124, plastic or metal angle brackets can be coupled to the lid section 116.

The blank 100 includes a clearance section 128 hingedly connected to the lid section 116 at a fold line 130. The clearance section 128 can define a substantially rectangular configuration having a width dimensioned smaller that the width of the lid section 116, and a length substantially smaller than the length of the lid section 116. Particularly, the clearance section 128 can provide a minimal lip for folding the lid section 116 over the remaining portion of the folded blank 100, reducing interference between the lid section 116 and the remaining components during folding operation. The fold line 130 can extend substantially perpendicularly to the axis 110.

The blank 100 includes a lateral face section 132 hingedly connected to the clearance section 128 by a fold line 134. In some embodiments, the lateral face section 132 can be hingedly connected directly to the lid section 116 and the blank 100 can be formed without the clearance section 128. The lateral face section 132 can define a substantially trapezoidal configuration with the proximal edge (at the fold line 134) having a width dimensioned greater than the opposing distal edge, and side edges tapering between the proximal and distal edges. The fold line 134 can extend substantially perpendicularly to the axis 110.

The blank 100 includes first and second side arm face sections 136, 138 (e.g., right and left side arm face sections) hingedly connected to opposing lateral sides of the lateral face section 132 at fold lines 140, 142. Each arm face section 136, 138 can define a substantially L-shaped configuration including a rectangular or trapezoidal vertical section 144, 146 and a rectangular lateral section 148, 150 with a rounded lateral edge 152, 154. The vertical sections 144, 146 can be hingedly connected to the lateral face section 132 at fold lines 140, 142 and extend at an angle relative to the axis 110 due to the trapezoidal shape of the lateral face section 132.

The lateral sections 148, 150 are integrally formed with the vertical sections 144, 146, extend substantially perpendicularly to the vertical sections 144, 146, and extend at an angle relative to the axis 110 due to the trapezoidal shape of the lateral face section 132. The width of the vertical sections 144, 146 can be dimensioned smaller than the length of the vertical sections 144, 146. The width of the lateral sections 148, 150 can be dimensioned greater than the length of the lateral sections 148, 150. In some embodiments, the arm face sections 136, 138 can include holes or openings 184, 186 formed therein near the distal edges of the vertical sections 144, 146. As will be discussed in greater detail below, rivets or sex bolts can be passed through the openings 184, 186 to secure the arm face sections 136, 138 to other sections/flaps of the blank 100 during the folding operation.

The blank 100 includes first and second lateral flaps 156, 158 (e.g., right and left side lateral flaps) hingedly connected to the edges of the vertical sections 144, 146 of the arm face sections 136, 138 at fold lines 160, 162. The fold lines 160, 162 can extend at an angle relative to the axis 110 and substantially parallel to the fold lines 140, 142. Each lateral flap 156, 158 can define a substantially triangular configuration with a rounded lateral edge 164, 166. The lateral flaps 156, 158 can be disposed between the vertical sections 144, 146 and lateral sections 148, 150 of the arm face sections 136, 138. In some embodiments, each lateral flap 156, 158 can include a hole or opening 168, 170 formed therein. The opening 168, 170 can be spaced from the rounded lateral edge 164, 166 and substantially centrally positioned relative to the side edges of the lateral flaps 156, 158. As will be discussed in greater detail below, the openings 168, 170 (and other similar openings in the blank 100) can receive fasteners or rivets therethrough to couple one or more components or flaps of the blank 100 to each other.

The blank 100 includes a bottom section 172 hingedly connected to the lateral face section 132 at a fold line 174. The bottom section 172 can define a substantially rectangular configuration having a width dimensioned substantially similar to the distal edge of the lateral face section 132. The fold line 174 can extend substantially perpendicularly to the axis 110.

The blank 100 includes first and second lateral tabs 176, 178 (e.g., right and left side lateral tabs) hingedly connected to the bottom section 172 at fold lines 180, 182. Each lateral tab 176, 178 can define a substantially trapezoidal configuration with a top edge 188, 190 angled relative to the axis 110 and the opposing bottom edge substantially perpendicular to the axis 110. The fold lines 180, 182 and the opposing lateral edges can be substantially parallel to the axis 110. In some embodiments, holes or openings 192, 194 can be formed in the lateral tabs 176, 180 for engagement with respective rivets. The openings 192, 194 can be spaced from and substantially centrally positioned relative to the edges of the lateral tabs 176, 178.

The blank 100 includes a medial face section 196 hingedly connected to the bottom section 172 at fold line 198. The medial face section 196 can define a substantially trapezoidal configuration with the width of the proximal edge dimensioned smaller than the width of the distal edge and tapered side edges. The fold line 198 can extend substantially perpendicularly to the axis 110. In some embodiments, holes or openings 200, 202 can be formed in the medial face section 196. The openings 200, 202 can be spaced from the side edges and centrally positioned along the length of the medial face section 196.

The blank 100 includes a rack face section 204 hingedly connected to the medial face section 196 at fold line 206. The distal edge of the rack face section 204 defines the bottom edge 106 of the blank 100. The rack face section 204 can define a substantially rectangular configuration with a width dimensioned greater than a length. The fold line 206 can extend substantially perpendicularly to the axis 110.

The blank 100 includes first and second rack tabs 208, 210 (e.g., right and left rack tabs) hingedly connected to opposing sides of the rack face section 204 at fold lines 212, 214. Each of the rack tabs 208, 210 can define a substantially rectangular configuration with a width dimensioned smaller than a length. The fold lines 212, 214 can extend substantially parallel to the axis 110. As will be discussed below, the sections/flaps/tabs of the blank 100 can be folded along respective fold lines to reconfigure the blank 100 from the unfolded configuration shown in FIG. 1 to a fully folded, functioning pannier of FIG. 12.

With reference to FIGS. 2-5, the pannier blank 100 is shown in a partially folded configuration. Although the discussion herein is regarding folding of a single blank 100, it should be understood that two blanks 100 can be similarly folded and subsequently engaged with each over (and/or with the bicycle rack) to form the pannier system. In some embodiments, a single folded blank 100 can be engaged with the bicycle rack and used without a second folded blank 100. For clarity, FIGS. 2-12 include reference numbers only for the sections, flaps and tabs, and FIG. 1 includes reference numbers for all fold lines.

Initially, as shown in FIGS. 2-5, the lateral tabs 176, 178 can be folded inwardly by approximately 90° towards the bottom section 172 at fold lines 180, 182 to a position substantially perpendicular to the bottom section 172. Next, the lateral face section 132 can be folded counterclockwise along fold line 174 to be substantially perpendicular to the bottom section 172. The arm face sections 136, 138 can be folded inwardly by approximately 90° to be positioned against the lateral tabs 176, 178. Particularly, the arm face sections 136, 138 can be folded inwardly to substantially align the openings 184, 186 with the openings 192, 194 of the lateral tabs 176, 178. Rivets or any other fasteners can be passed through the openings 184, 186, 192, 194 to secure the arm face sections 136, 138 to the lateral tabs 176, 178

The lid section 116 can then be folded clockwise along fold line 130 to be substantially perpendicular to the lateral face section 132. In some embodiments, the clearance section 128 can be folded clockwise along fold line 134 (instead of folding the lid section 116) to be substantially perpendicular to the lateral face section 132, while remaining substantially parallel to the lid section 116. The lateral flaps 156, 158 can be partially rotated outwardly away from the lateral face section 132 along fold lines 160, 162.

The subsequent folding steps are shown in FIGS. 6-9. The rack tabs 208 can be folded inwardly by approximately 90° towards the rack face section 204 at fold lines 212, 214. The medial face section 196 can be folded clockwise towards the lateral face section 132 along fold line 198 until the side edges of the medial face section 196 are substantially aligned with fold lines 160, 162 of the arm face sections 136, 138. Next, the lateral flaps 156, 158 can be folded inwardly at fold lines 160, 162 to be positioned against the outer surface of the medial face section 196.

Particularly, the openings 168, 170 of the lateral flaps 156, 158 can be substantially aligned with the openings 200, 202 of the medial face section 196. Rivets or any other fasteners can be passed through the openings 168, 170, 200, 202 to secure the lateral flaps 156, 158 to the medial face section 196. The rack face section 204 can then be folded counterclockwise by approximately 90° until the fold lines 212, 214 are substantially aligned with the bottom edge of the rectangular lateral sections 148, 150 of the arm face sections 136, 138. In such operation, the rack tabs 208, 210 can be positioned against the inner surface of the arm face sections 136, 138. In some embodiments, rivets or any other fastener can be used to secure the rack tabs 208, 210 to the arm face sections 136, 138.

Figure 10:
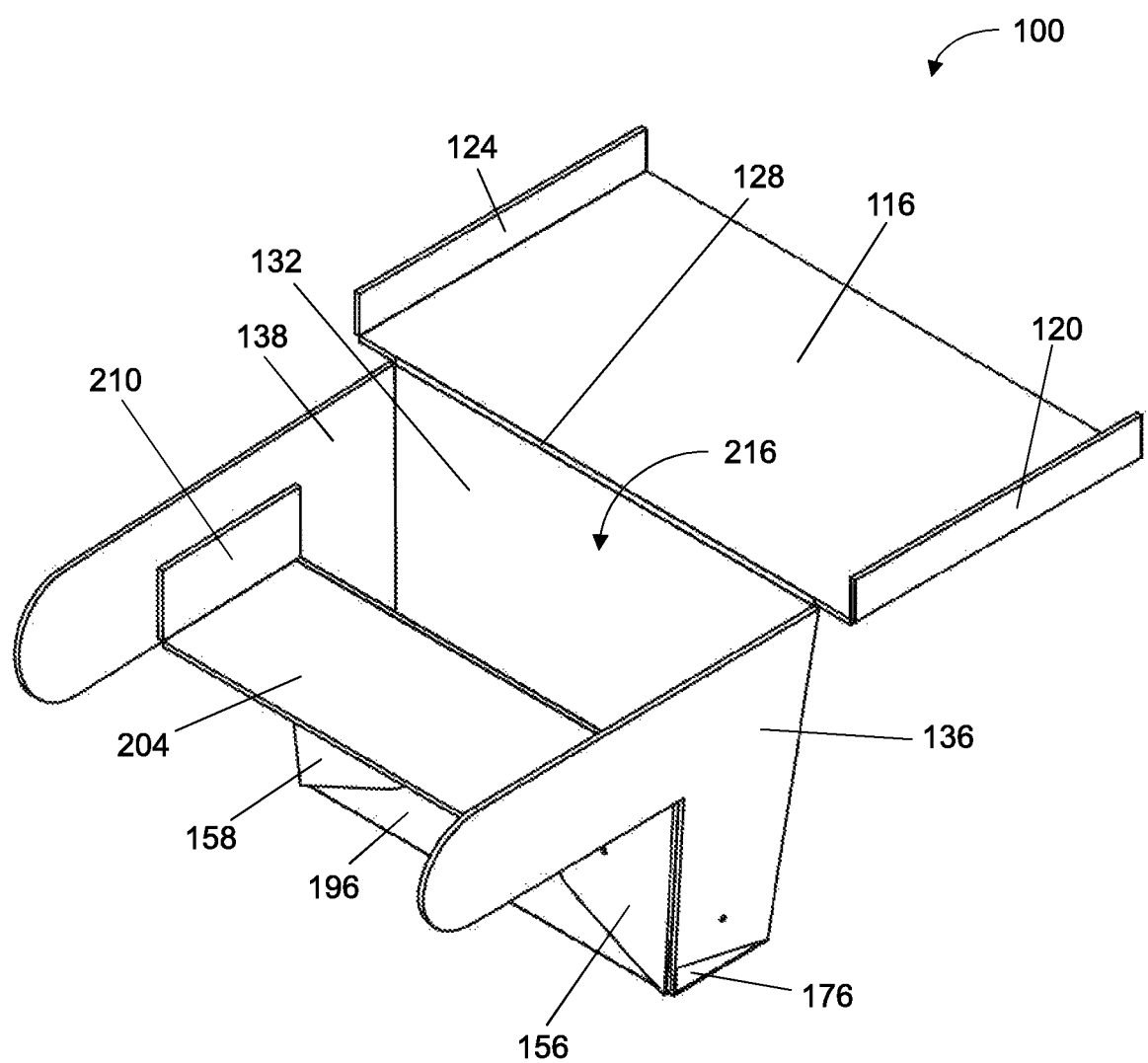
FIG. 10 is a perspective view of an exemplary pannier blank of the present disclosure in a partially folded configuration.
Figure 11:
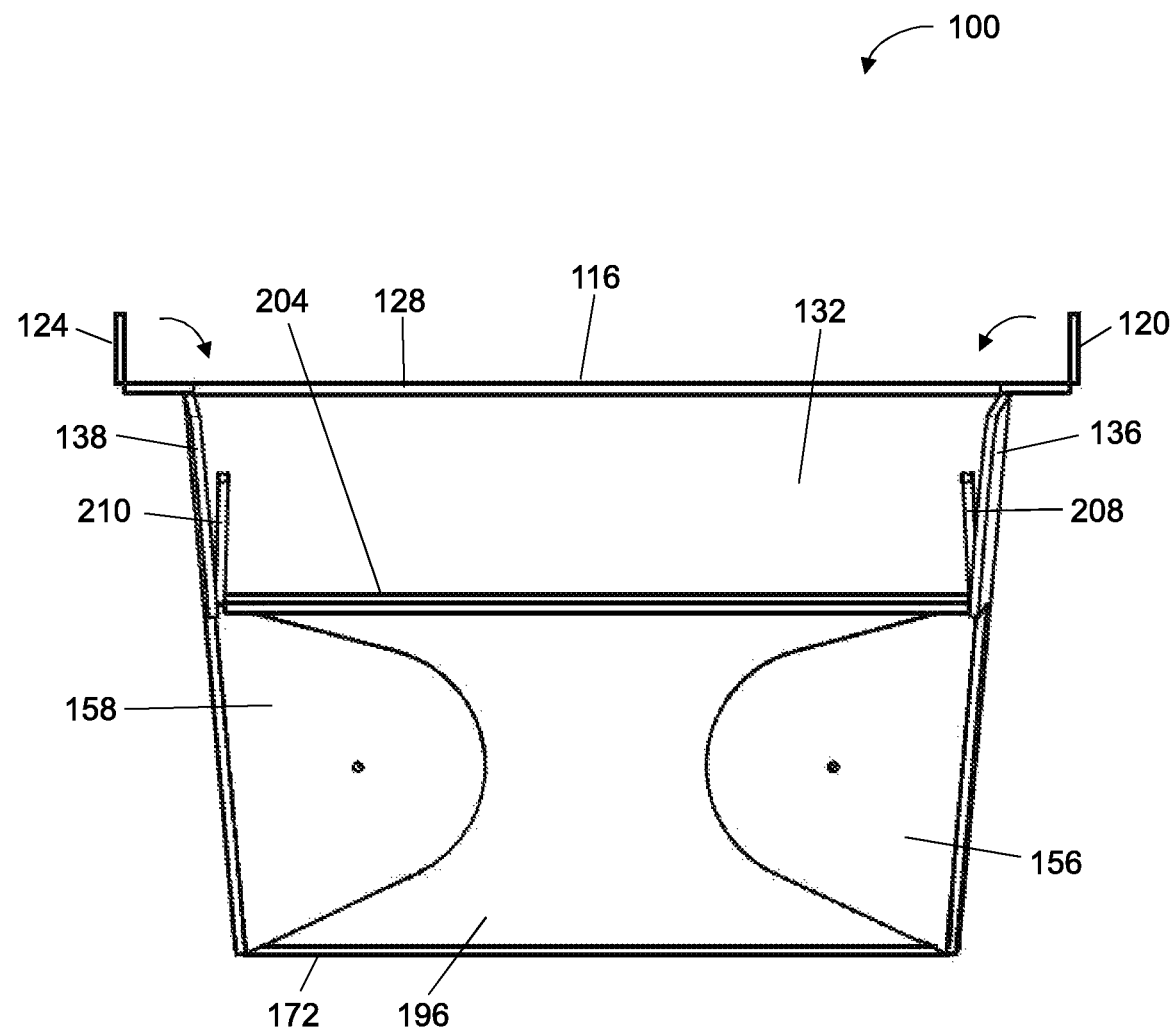
FIG. 11 is a side view of an exemplary pannier blank of FIG. 10.
Figure 12:
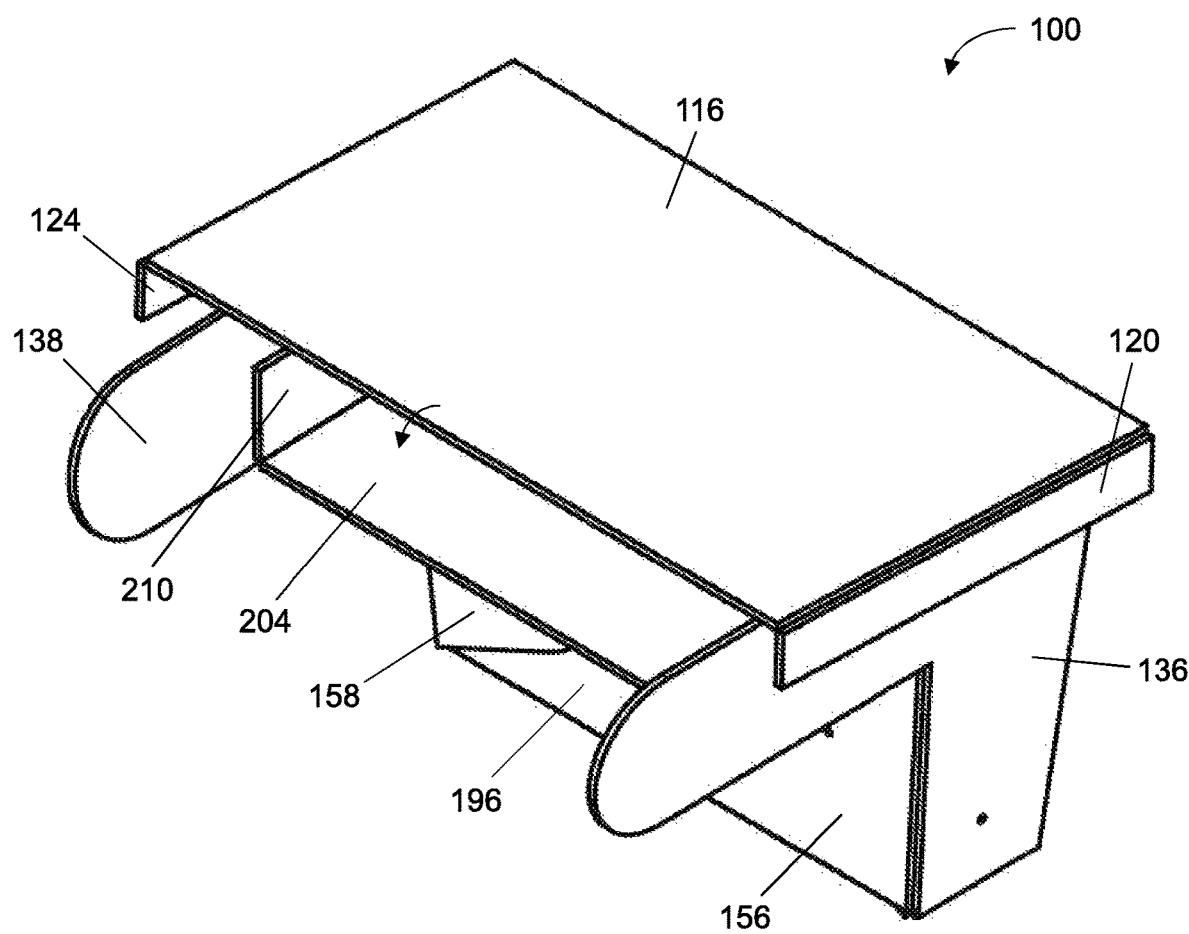
FIG. 12 is a perspective view of an exemplary pannier blank of the present disclosure in a fully folded configuration.
Figure 13:
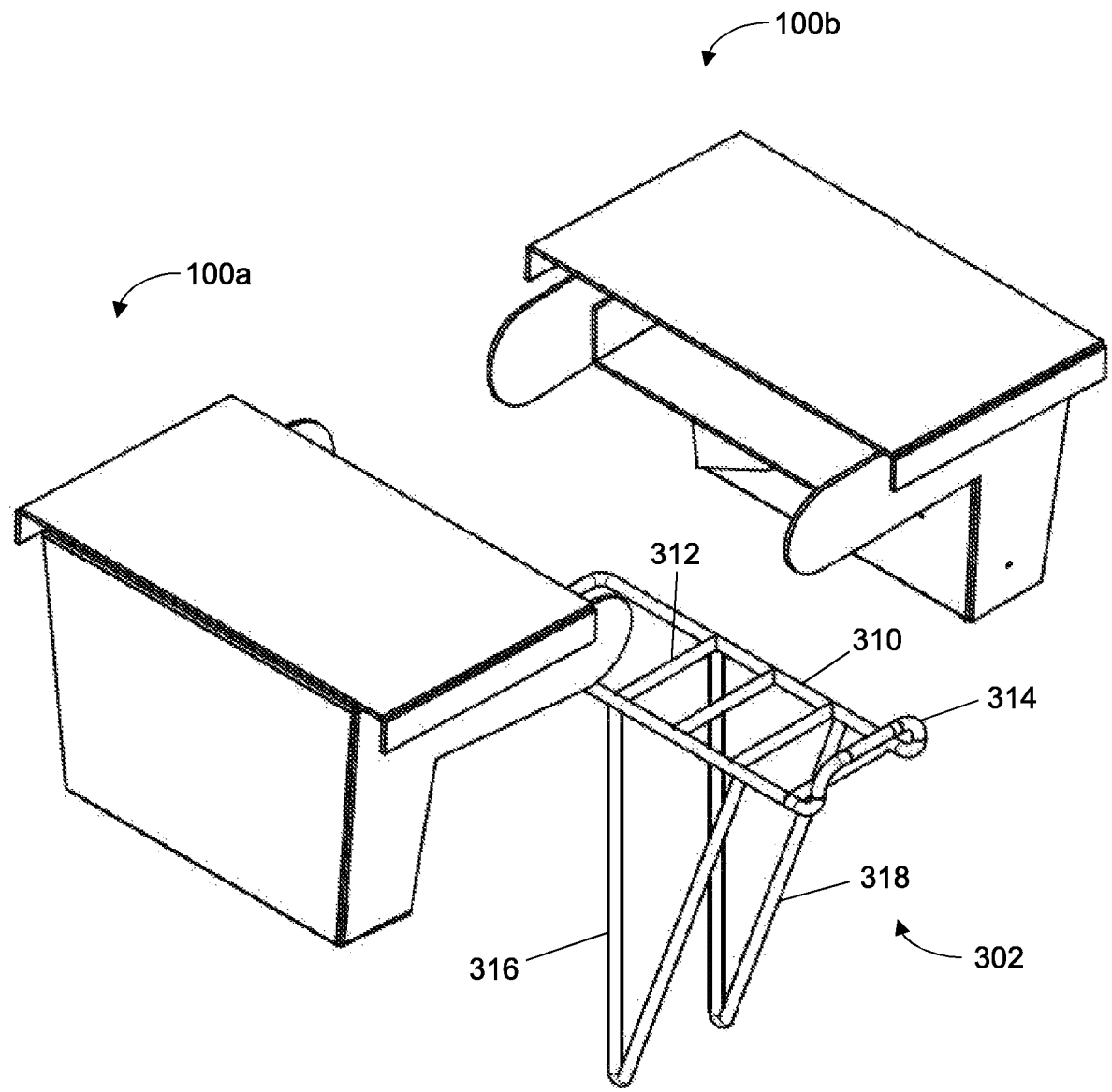
FIG. 13 is a perspective view of an exemplary pannier system of the present disclosure in preparation for mounting on a bicycle rack.
Figure 14:
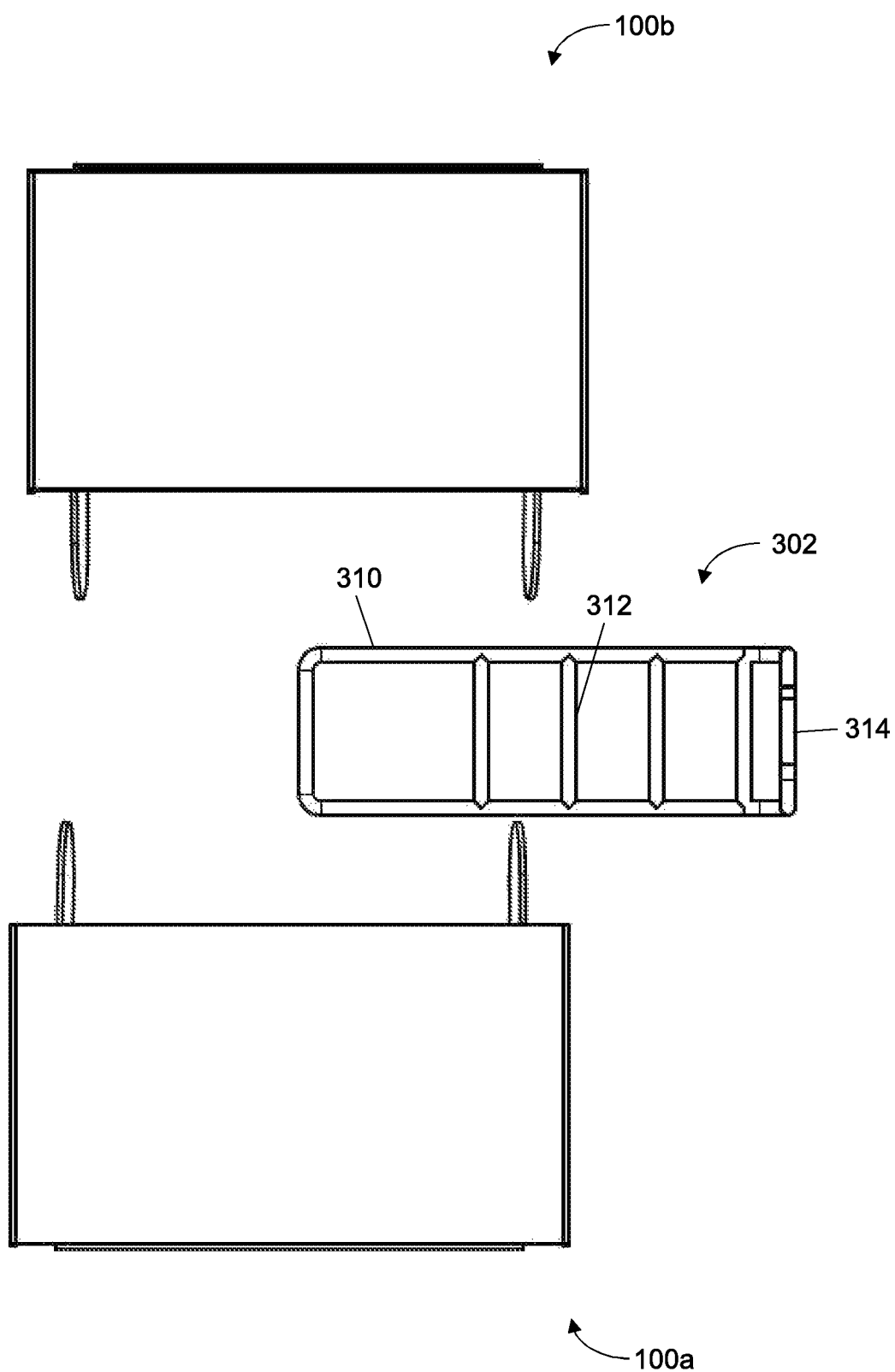
FIG. 14 is a top view of an exemplary pannier system of the present disclosure in preparation for mounting on a bicycle rack.
Figure 15:
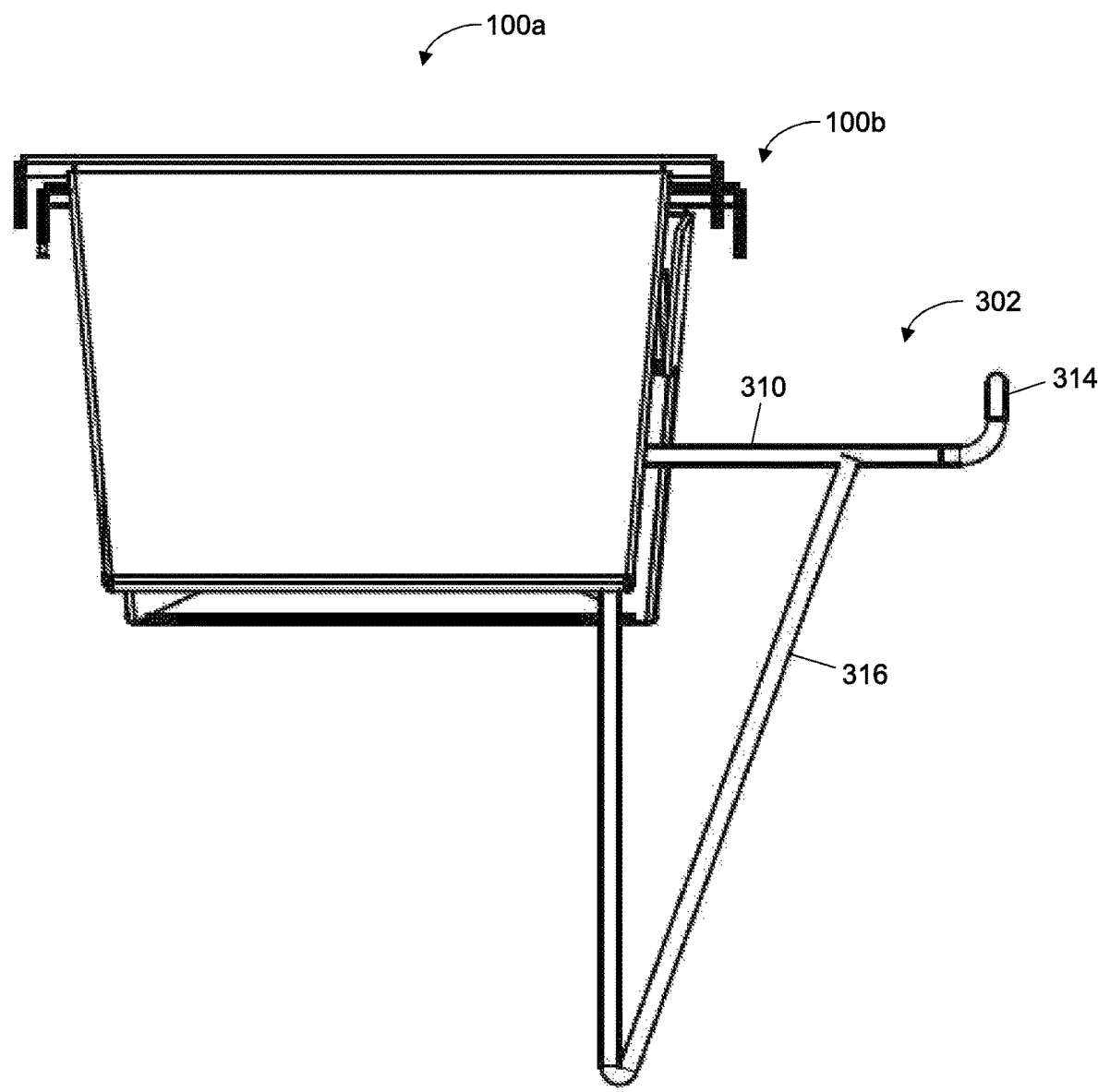
FIG. 15 is a side view of an exemplary pannier system of the present disclosure in preparation for mounting on a bicycle rack.
Figure 16:
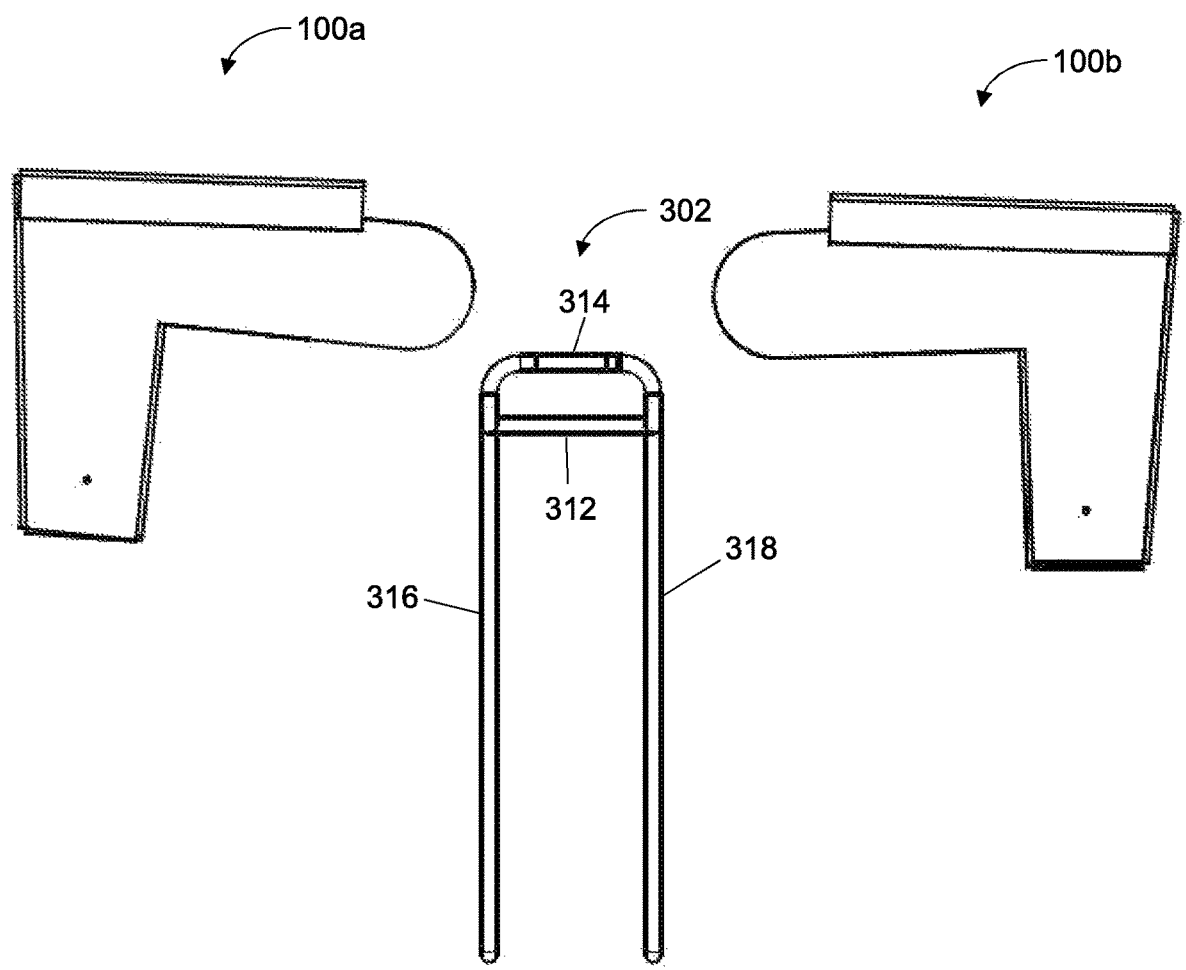
FIG. 16 is a front view of an exemplary pannier system of the present disclosure in preparation for mounting on a bicycle rack.
Figure 17:
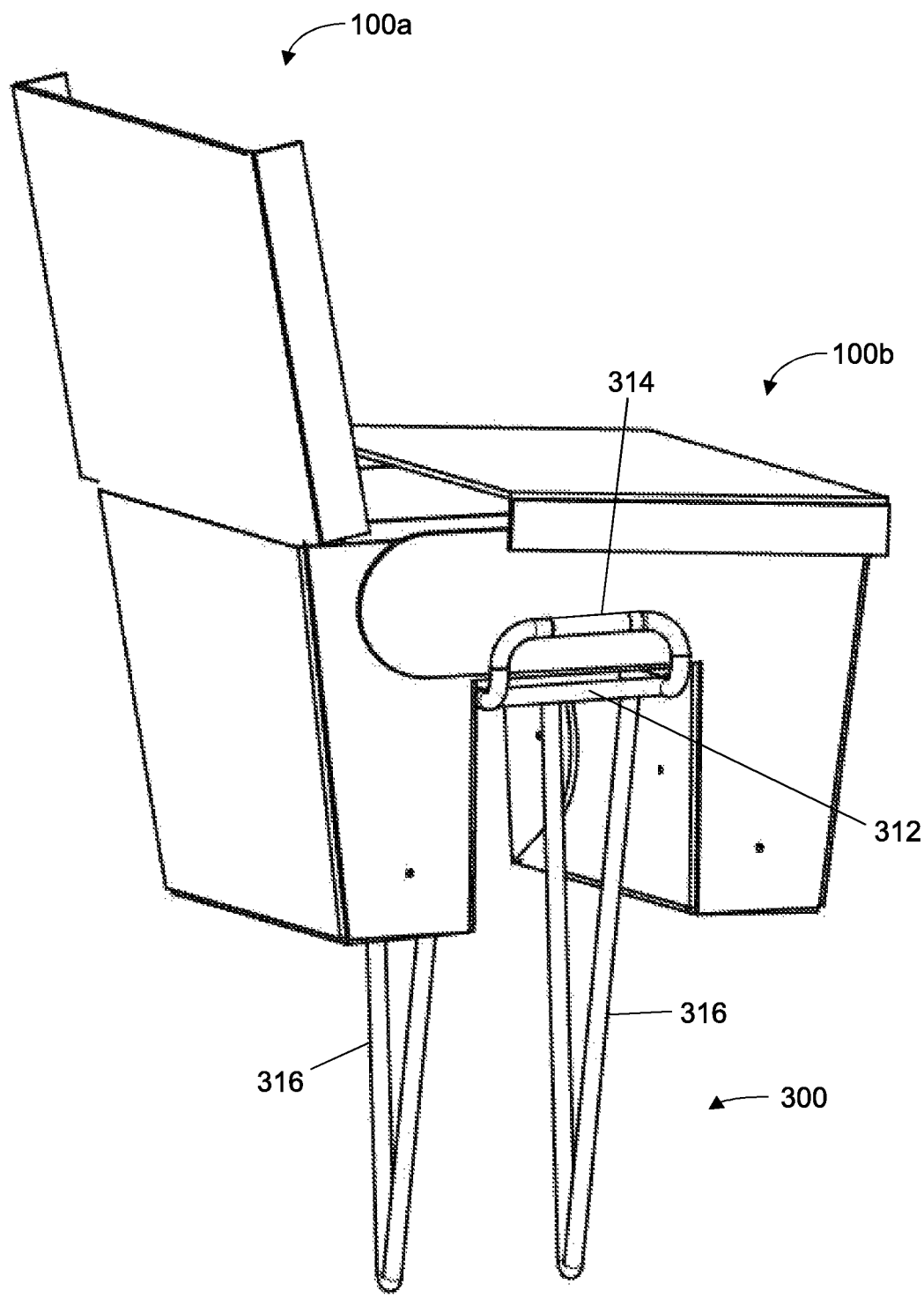
FIG. 17 is a perspective view of an exemplary pannier system of the present disclosure mounted on a bicycle rack with one lid section open.
Figure 18:
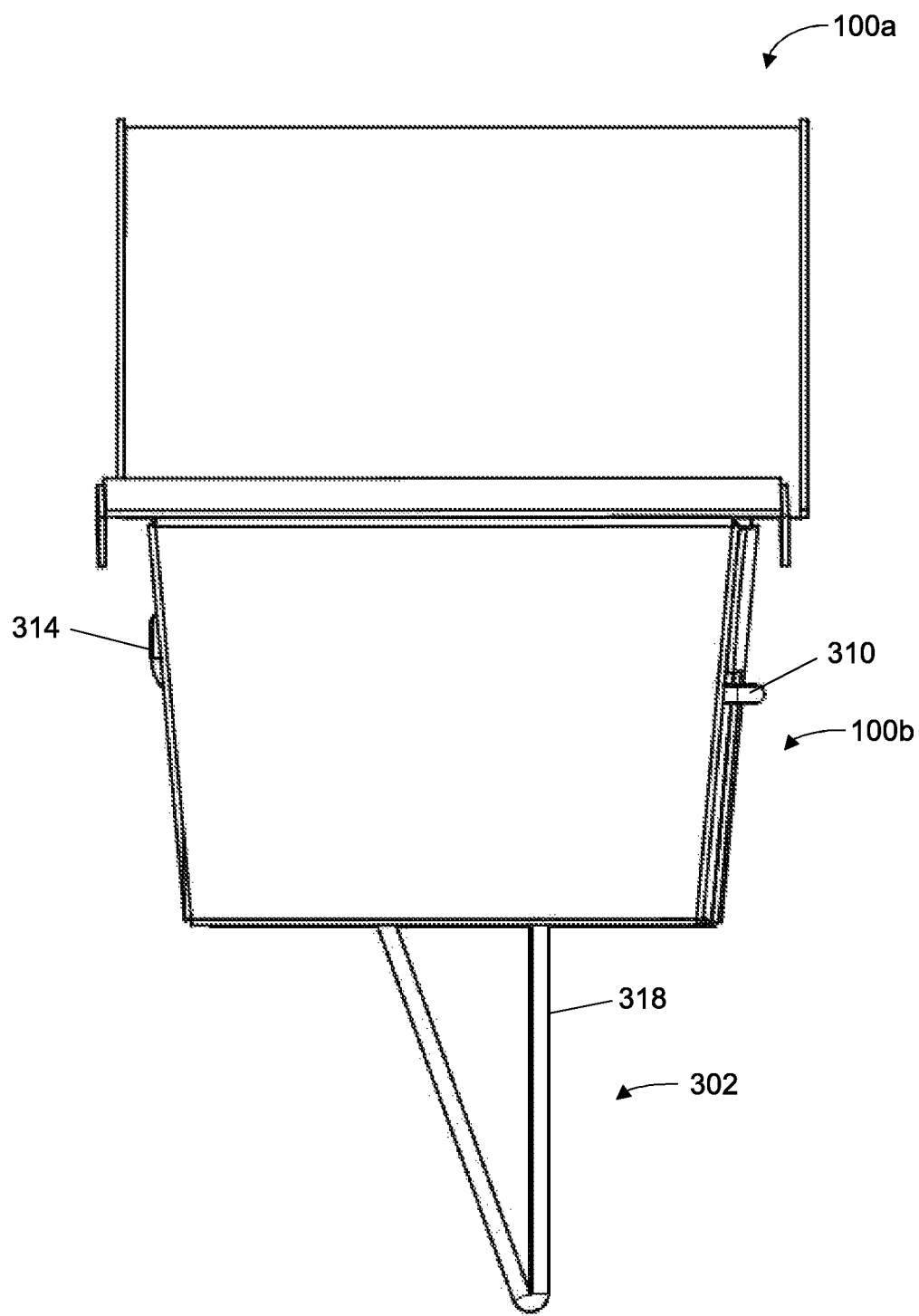
FIG. 18 is a side view of an exemplary pannier system of the present disclosure mounted on a bicycle rack with one lid section open.
Figure 19:
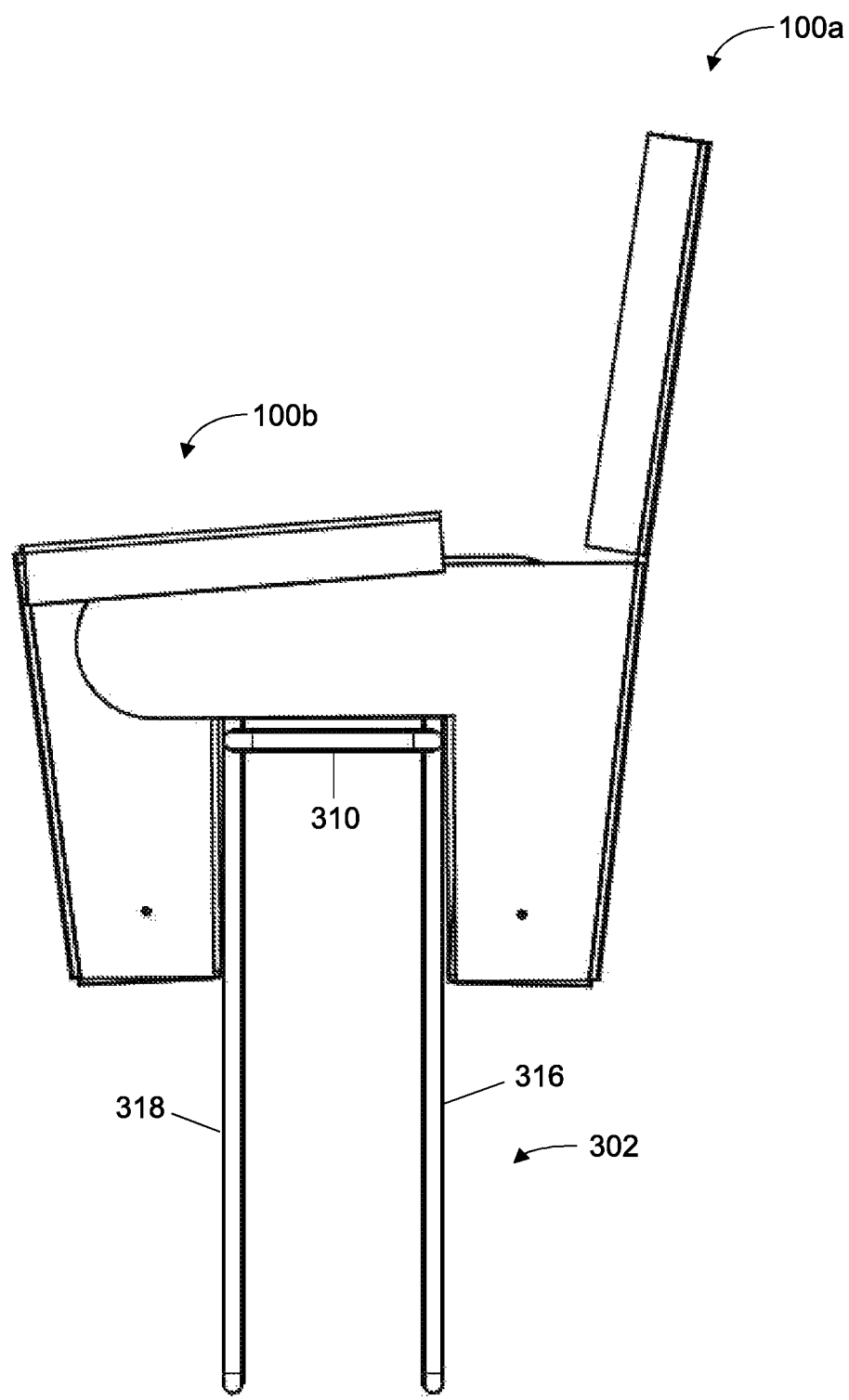
FIG. 19 is a rear view of an exemplary pannier system of the present disclosure mounted on a bicycle rack with one lid section open.
Figure 20:
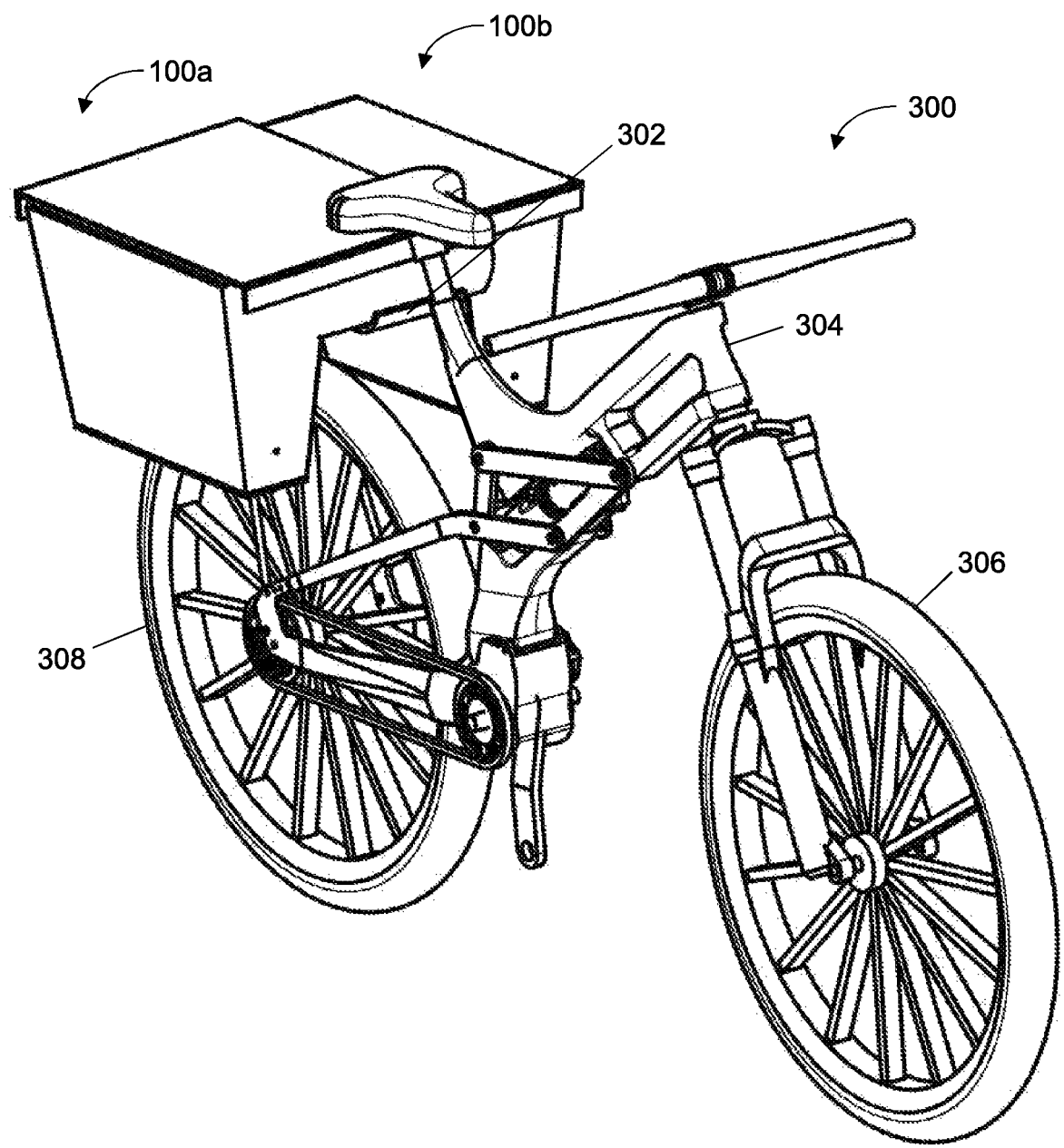
FIG. 20 is a perspective view of an exemplary pannier system of the present disclosure mounted on a bicycle rack with both lid sections in a closed configuration.

The subsequent folding steps are shown in FIGS. 10-12. Particularly, the overhang sections 120, 124 can be folded inwardly towards the lid section 116 by approximately 90° at fold lines 122, 126. As shown in FIG. 12, the lid section 116 can be folded counterclockwise by approximately 180° at fold line 130 to open and close the lid section 116. The blank 100 is shown in FIGS. 10-12 in a fully folded, pannier configuration capable of receiving one or more items in an enclosure 216 formed by the folded sections, flaps and tabs, and the lid section 116 can be folded over the enclosure 216 to protect the contents within the enclosure 216 (see, e.g., FIGS. 10 and 12).

FIGS. 13-16 show various views of two folded blanks (designated as blank 100a and 100b) in preparation for mounting the blanks 100a, 100b on a rack 302 of a bicycle 300. The blanks 100a and 100b collectively can form an exemplary pannier system. FIGS. 17-20 show the blanks 100a, 100b mounted to the rack 302. It should be understood that two blanks 100 can be folded in a substantially similar manner, and the first blank 100a can be rotated approximately 180 degrees to face the second blank 100b in preparation for engagement over the rack 302.

The bicycle 300 generally includes a frame 304, a front wheel 306, and rear wheel 308, and the rack 302 mounted to the frame 304. In some embodiments, the rack 302 can be mounted over the rear wheel 308. In some embodiments, the rack 302 can be mounted over the front wheel 306. Although a bicycle 300 is shown, it should be understood that the blanks 100a, 100b can be mounted to any type of vehicle having a rack 302 or supporting surface. Further, although two blanks 100a, 100b are shown, it should be understood that in some embodiments only a single blank 100a, 100b can be mounted to the rack 302 or supporting surface.

The rack 302 can include a supporting top surface 310, cross-bars 312 extending between the side members of the top surface 310, a front raised edge 314, and downwardly directed extensions 316, 318 (e.g., triangular shaped extensions) for mounting the rack 302 to the frame 304 of the bicycle 300. During mounting, the first folded blank 100a can be slightly laterally offset from the second folded blank 100b such that the arm face section 136 of the first blank 100a is positioned against the outer surface of the arm face section 138 of the second blank 100a, and the arm face section 138 of the first blank 100a is positioned against the inner surface of the arm face section 136 of the second blank 100b (see, e.g., FIG. 17).

In some embodiments, the lateral and/or medial position of the fold lines 122, 126 for the overhang sections 120, 124, and the lateral and/or medial position of the fold lines 212, 214 for the rack tabs 208, 210 can be shifted slightly (e.g., by 0.25 inches or less, by the material thickness, or the like) to allow for clearance between the lid sections 116 of the offset blanks 100a, 100b. The blanks 100a, 100b can be positioned over the rack 302 and slid towards each other until the medial face sections 196 are positioned against or immediately adjacent to the edges of the rack 302. Particularly, the medial face sections 196 remain spaced and form a passage in-between the blanks 100a, 100b configured to receive the rack 302.

In such position, the rack face sections 204 partially or fully overlap, and the interleaved rack face sections 204 are disposed over the top surface 310 of the rack 302. In some embodiments, the rack face sections 204 of the opposing blanks can be fastened to each other with the use of glue, rivets, VELCRO™, ultrasonic weld, sex bolts, or any other fastening element. In some embodiments, ultrasonic weld, rivets or any other fasteners can be used to secure the arm face sections 136, 138 of the opposing blanks 100a, 100b to each other. In some embodiments, rivets, ultrasonic weld, or any other fasteners can be used to secure the arm face sections 136, 138, and one or both of the rack tabs 210 of the opposing blanks 100a, 100b to each other. Straps, VELCRO™, or any other securing elements (not shown) can be used to secure the blanks 100a, 100b to the rack 302 to maintain the position of the blanks 100a, 100b during riding.

Figure 21:
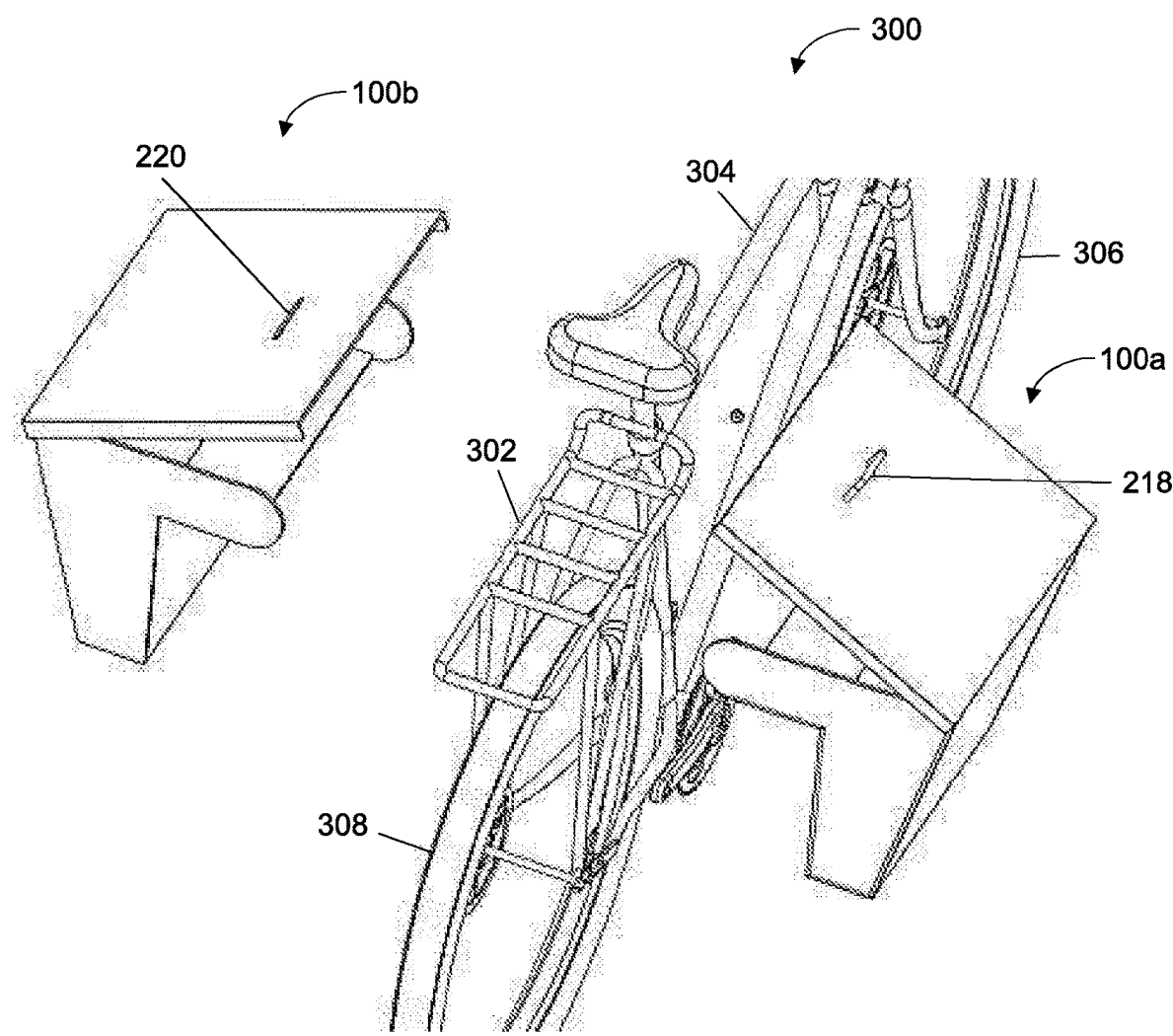
FIG. 21 is a perspective view of an exemplary pannier system of the present disclosure in preparation for mounting on a bicycle rack, the pannier system including pannier blanks with a handle assembly.

As noted above, any type of attachment mechanism 118 (e.g., VELCRO™, or the like) can be used to releasably secure the lid sections 116 of the blanks 100a, 100b to each other to maintain the lid sections 116 closed. In some embodiments, as shown in FIG. 21, a handle 218 can be mounted to the outer surface of the lid section 116 of the first blank 100a and a complementary cutout 220 can be formed in the opposing lid section 116 of the second blank 100b. In such embodiments, when the lid section 116 of the second blank 100b is closed over the lid section 116 of the first blank 100a, the cutout 220 can receive therethrough the protruding handle 218. Engagement between the handle 218 and the cutout 220 can maintain the closed position of the lid sections 116.

Figure 22:
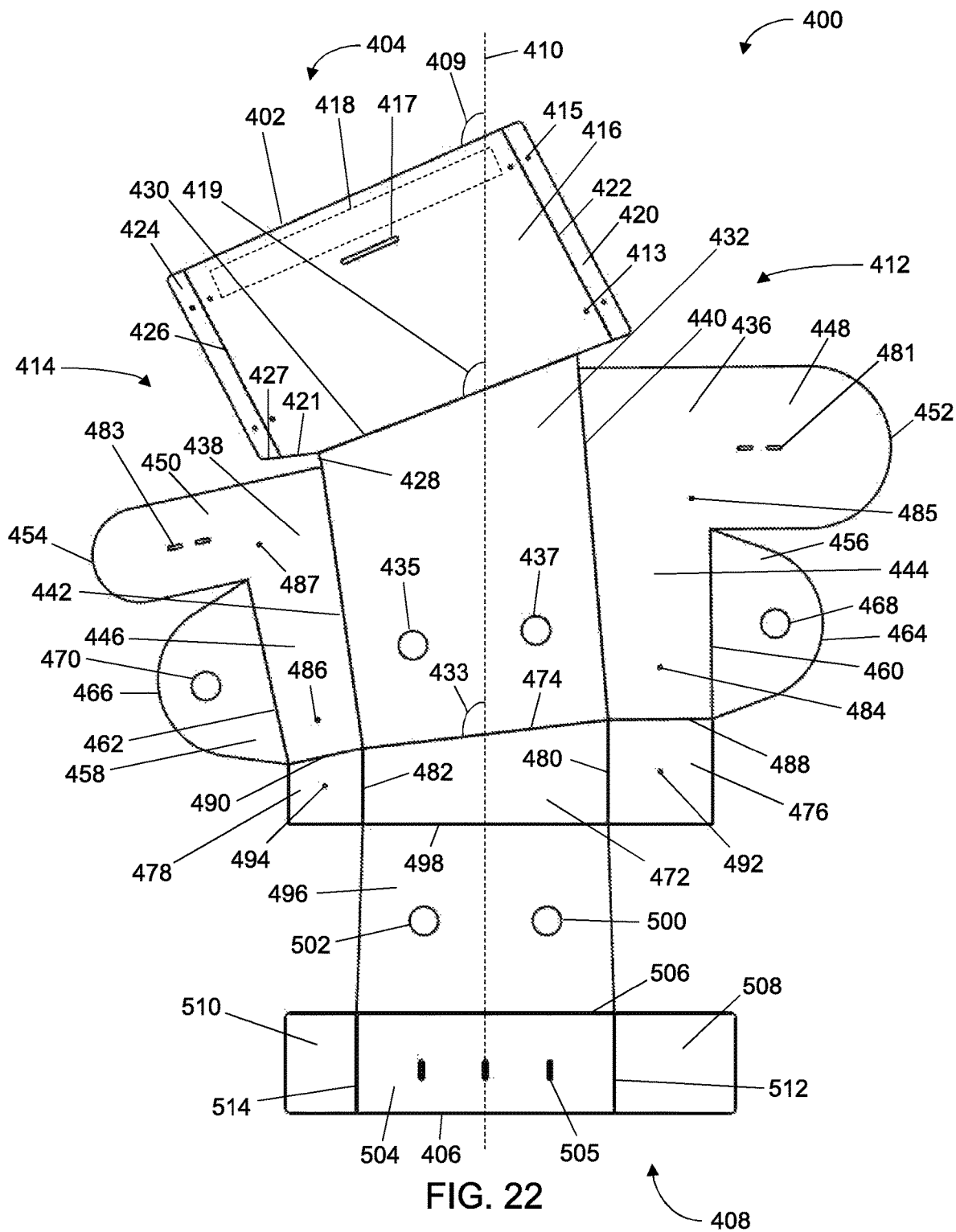
FIG. 22 is a top view of an exemplary pannier blank of the present disclosure in an unfolded configuration.

FIG. 22 is a top view of an exemplary pannier blank 400 in an unfolded, substantially flat configuration. The blank 400 can be substantially similar in structure and function to the blank 100, except for the distinctions discussed herein. Particularly, rather than defining a substantially symmetrical configuration, the blank 400 includes an asymmetrical configuration in both the unfolded and folded states. The asymmetrical features of the blank 400 provide for lateral face tilt and lid tilt. Such tapering configurations of the lateral and lid surfaces provides for greater aerodynamics of the folded pannier, and the angled or tapered configuration of the lid surface improves moisture protection by quickly removing moisture from the top of the pannier. In some embodiments, the blank 400 can optionally include openings configured to receive one or more tubes. In such embodiments, the tubes of the folded pannier mitigate cross-winds, improve the structural strength of the pannier, and provide additional access to contents stored within the pannier.

Still with reference to FIG. 22, the flat and planar configuration of the blank 400 in the unfolded configuration can define a substantially uniform thickness. For reference, a top edge 402 of the blank 400 defines a proximal end 404 and a bottom edge 406 defines a distal end 408 of the blank 400. A central, vertical axis 410 extends between the proximal and distal ends 404, 408. The top and bottom edges 402, 406 extend in a non-parallel orientation relative to each other. The bottom edge 406 extends substantially perpendicularly relative to the axis 410, while the top edge 402 extends at a non-perpendicular angle 409 relative to the axis 410. The angle 409 can be from about 95° and about 150° relative to the axis 410. For reference, the lateral side of blank 400 on the right side of the axis 410 as viewed from the top can be referred to as the right side 412 of the blank, and the lateral side of the blank 400 on the left side of the axis 410 as viewed from the top can be referred to as the left side 414. Some of the flaps/sections and fold lines on the right and left sides 412, 414 of the axis 410 can be substantially symmetrical, while other flaps/sections and fold lines on the right and left sides 412, 414 of the axis 410 can be asymmetrical to provide for the tapered or tilted configuration of the blank 400 in the folded configuration. As referred to herein, a length of a component can refer to a distance substantially parallel or extending vertically relative to the axis 410, and a width of a component can refer to a distance substantially perpendicular to or extending horizontally relative to the axis 410.

The blank 400 includes a lid section 416 at the proximal end 404. The lid section 416 can define a substantially rectangular configuration, with one edge being defined by the top edge 402 of the blank 400. In some embodiments, the inner surface of the lid section 416 (the surface facing upwardly in FIG. 22) can include an attachment mechanism 418 (e.g., VELCRO™, or the like) near the top edge 402. The outer, opposing surface of a second blank 400 can include a complementary attachment mechanism 418 such that the lid sections 416 of the two blanks 400 can be releasably engaged when in the folded configuration. In some embodiments, the lid section 416 can include an opening 417 formed therein spaced from the top edge 402. The opening 417 can receive therethrough a handle mounted to the outer surface of the lid section 416 of a second blank 400, engagement of the handle with the opening 417 maintaining the lid sections 416 in the closed configuration.

The bottom edge of the lid section 416 is defined by a fold line 430. The top edge 402 and the fold line 430 are both oriented at respective non-perpendicular angles 409, 419 relative to the axis 410. In some embodiments, the angles 409, 419 can be substantially equal to each other such that the top edge 402 and fold line 430 extend substantially parallel to each other. In some embodiments, the angles 409, 419 can be different front each other such that the top edge 402 and fold line 430 are angled to each other. In some embodiments, one section 421 of the bottom edge of the lid section 416 can be at an angled relative to the fold line 430 towards the top edge 402. The angled relationship between the top edge 402 and fold line 430 provides for the angled or tilted lid section 416 when the blank 400 is in the folded configuration.

The blank 400 includes a first overhang section 420 (e.g., right side overhang) hingedly connected to the right side of the lid section 416 at a fold line 422. The blank 400 includes a second overhang section 424 (e.g., a left side overhang) hingedly connected to the opposing, left side of the lid section 416 at a fold line 426. The overhang sections 420, 424 can define substantially rectangular configurations. In some embodiments, each of the overhang sections 420, 424 can include a pair of openings 413 complementary to a pair of openings 413 formed near the respective fold lines 422, 426 on either side of the lid section 416. In some embodiments, rather than or in addition to the overhang sections 420, 424, plastic or metal angle brackets can be coupled to the lid section 416. In some embodiments, when the overhang sections 420, 424 are folded inwardly during the folding process, a reinforcing angle bracket (e.g., plastic, steel, aluminum, or the like) can be mated with the overhang sections 420, 424 and the lid section 416 via the openings 413, 415. For example, rivets can be passed through the openings 413, 415 to secure the angle bracket to the blank 400. The angle bracket can maintain the overhang sections 420, 424 in the folded position, maintaining the protective function of the lid section 416 without affecting the ability of the blank 400 to be collapsed into a substantially flat configuration.

In some embodiments, the overhang section 424 includes an angled bottom edge 427 that extends in-line with the section 421 of the lid section 416. The angled bottom edge 427 results in the surface area of the overhang section 424 being dimensioned smaller than the surface area of the overhang section 420. The fold lines 422, 426 extend at angles relative to the axis 410. The overhang sections 420, 424 can have a width dimensioned substantially smaller than the width of the lid section 416, and a length substantially equal to the length of the lid section 416. Although exemplary dimensions or dimensional relationships are discussed herein, it should be understood that the dimensions of the flaps can be adjusted based on the configuration of the bicycle on which the pannier is to be mounted and/or the size of the items that are to be stored within the pannier.

The blank 400 includes a lateral face section 432 hingedly connected to the fold line 430. The lateral face section 432 can define a substantially polygonal configuration. Each of the four sides of the lateral face section 432 can extend at non-parallel and non-perpendicular angles relative to the axis 410. The angle 419 of the fold line 430 can be different from the angle 433 of the fold line 474 defining the bottom edge of the lateral face section 432. In some embodiments, the proximal edge (at the fold line 430) can have a width dimensioned greater than the opposing distal edge (at the fold line 474), and side edges tapering between the proximal and distal edges. The lateral face section 432 includes two openings 435, 437 formed therein on opposing sides of the axis 410. The openings 435, 437 can be configured and dimensioned to receive at least partially therethrough respective wind tubes.

The blank 400 includes first and second side arm face sections 436, 438 (e.g., right and left side arm face sections) hingedly connected to opposing lateral sides of the lateral face section 432 at fold lines 440, 442. In some embodiments, each of the side arm face sections 436, 438 can be spaced from the fold line 430 by a distance 428. Such spacing provides a clearance section for folding the lid section 416 over the remaining portion of the folded blank 400, reducing interference between the lid section 416 and the remaining components during folding operation. The side arm face section 438 can be dimensioned smaller in surface area relative to the side arm face section 436. The difference in size provides for the angled closure of the lid section 416. Each arm face section 436, 438 can define a substantially L-shaped configuration including a rectangular or trapezoidal vertical section 444, 446 and a rectangular lateral section 448, 450 with a rounded lateral edge 452, 454. The vertical sections 444, 446 can be hingedly connected to the lateral face section 432 at fold lines 440, 442 and extend at an angle relative to the axis 410 due to the angled fold line 474 of the lateral face section 432.

The lateral sections 448, 450 are integrally formed with the vertical sections 444, 446, extend substantially perpendicularly to the vertical sections 444, 446, and extend at an angle relative to the axis 410 due to the angled orientation of the lateral face section 132. The width of the vertical sections 444, 446 can be dimensioned smaller than the length of the vertical sections 444, 446. The width of the lateral sections 448, 450 can be dimensioned greater than the length of the lateral sections 448, 450. In some embodiments, the arm face sections 436, 438 can include holes or openings 484-487 formed therein near the distal edges of the vertical sections 444, 446 and between the vertical and lateral sections 444-450. As will be discussed in greater detail below, fasteners (e.g., rivets or sex bolts) can be passed through the openings 484, 486 to secure the arm face sections 436, 438 to other sections/flaps of the blank 400 during the folding operation. The diameter of the openings 484-487 can be dimensioned smaller than the diameter of the openings 435, 437 of the lateral face section 432.

In some embodiments, the arm face sections 436, 438 can include one or more elongated slots 481, 483 (e.g., pairs of slots aligned with each other) formed therein. In some embodiments, the slots 481 extend in-line and substantially perpendicular to the fold line 460, while the slots 483 extend in-line and substantially perpendicular to the fold line 462 (which is at an angle to the axis 410). The slots 481, 483 can receive a fastening member (e.g., rivet) therethrough to fasten one folded blank 400 to an opposing folded blank 400. The slots 481, 483 act as mating slots and overlap with the two blanks 400 during assembly of the pannier system. The slot 482, 483 configuration allows the distance between the medial faces of the mating panniers to be adjusted for optimal rack fit. Particularly, the distance between the two folded blanks 400 can be adjusted as needed based on the dimensions of the bicycle rack, allowing the pannier system to be customized for bicycles and/or racks of different sizes. A pair of slots 481, 483 can be used on each side to ensure parallel mating between the two panniers.

The blank 400 includes first and second lateral flaps 456, 458 (e.g., right and left side lateral flaps) hingedly connected to the edges of the vertical sections 444, 446 of the arm face sections 436, 438 at fold lines 460, 462. The fold lines 460, 462 can extend at an angle relative to the axis 410 and substantially parallel to the fold lines 440, 442. In some embodiments, the fold lines 460, 462 can extend at an angle relative to the fold lines 440, 442. Each lateral flap 456, 458 can define a substantially triangular configuration with a rounded lateral edge 464, 466. The lateral flaps 456, 458 can be disposed between the vertical sections 444, 446 and lateral sections 448, 450 of the arm face sections 436, 438. In some embodiments, each lateral flap 456, 458 can include a hole or opening 468, 470 formed therein. The opening 468, 470 can be spaced from the rounded lateral edge 464, 466 and substantially centrally positioned relative to the side edges of the lateral flaps 456, 458. The diameter of the openings 468, 470 can be dimensioned substantially equal to the diameter of the openings 435, 437 such that each of the openings 468, 470 can receive at least partially therethrough a wind tube.

The blank 400 includes a bottom section 472 hingedly connected to the lateral face section 432 at the fold line 474. The bottom section 472 can define a substantially trapezoidal configuration. The fold line 474 defining the top edge of the bottom section 472 can extend at the angle 433 to the axis 410, while the opposing edge fold line 498 extends substantially perpendicularly to the axis 410. The fold lines 480, 482 defining the side edges of the bottom section 472 extend substantially parallel to the axis 410. As will be discussed in greater detail below, the angled configuration of the fold line 474 results in a lateral side taper of the blank 400 in the folded configuration.

The blank 400 includes first and second lateral tabs 476, 478 (e.g., right and left side lateral tabs) hingedly connected to the bottom section 472 at fold lines 480, 482. Each lateral tab 476, 478 can define a substantially trapezoidal configuration with a top edge 488, 490 angled relative to the axis 410 and the opposing bottom edge substantially perpendicular to the axis 410. The fold lines 480, 482 and the opposing lateral edges can be substantially parallel to the axis 410. In some embodiments, holes or openings 492, 494 can be formed in the lateral tabs 476, 480 for engagement with respective rivets. The openings 492, 494 can be spaced from and substantially centrally positioned relative to the edges of the lateral tabs 476, 478. The openings 492, 494 can be dimensioned substantially equal in diameter to the openings 484, 486.

The blank 400 includes a medial face section 496 hingedly connected to the bottom section 472 at fold line 498. The medial face section 496 can define a substantially trapezoidal configuration with the width of the proximal edge dimensioned smaller than the width of the distal edge, and tapered side edges. The fold line 498 can extend substantially perpendicularly to the axis 410. In some embodiments, holes or openings 500, 502 can be formed in the medial face section 496. The openings 500, 502 can be spaced from the side edges and centrally positioned along the length of the medial face section 496. The openings 500, 502 can be dimensioned substantially equal in diameter to the openings 435, 437, and can be configured to receive at least partially therethrough respective wind tubes.

The blank 400 includes a rack face section 504 hingedly connected to the medial face section 496 at fold line 506. The distal edge of the rack face section 504 defines the bottom edge 406 of the blank 400. The rack face section 504 can define a substantially rectangular configuration with a width dimensioned greater than a length. The fold line 506 can extend substantially perpendicularly to the axis 410. In some embodiments, the rack face section 504 can include one or more elongated slots 505 formed therein and extending substantially parallel to the axis 410.

Similar to the slots 481, 483, the slots 505 act as mating slots and overlap with the two blanks 400 during assembly of the pannier system. Sex bolts, nuts/bolts, or any other fastener can be passed through the slots 505 to couple the blanks 400 together. The slot 505 configuration allows the distance between the medial faces of the mating panniers to be adjusted for optimal rack fit. Particularly, the distance between the two folded blanks 400 can be adjusted as needed based on the dimensions of the bicycle rack, the bicycle and/or the items to be carried within the pannier, allowing the pannier system to be customized for items, bicycles and/or racks of different sizes. Two or more slots 505 can be used on each side of the axis 410 to ensure parallel mating between the two panniers.

The blank 400 includes first and second rack tabs 508, 510 (e.g., right and left rack tabs) hingedly connected to opposing sides of the rack face section 504 at fold lines 512, 514. Each of the rack tabs 508, 510 can define a substantially rectangular configuration with a width dimensioned smaller than a length. The fold lines 512, 514 can extend substantially parallel to the axis 510. In the folded configuration, the rack tabs 508, 510 can buttress against the inside of the respective arm face sections 436, 438 to improve the structural rigidity of the folded pannier system. In some embodiments, the rack tabs 508, 510 can overlap with the slots 481, 483 of the respective arm face sections 436, 438 such that a rivet, bolt or any other fastener can be passed through the rack tabs 508, 510 and art face sections 436, 438 of opposing panniers. Such coupling can secure all four faces together to improve the structural stability of the pannier system. As will be discussed below, the sections/flaps/tabs of the blank 400 can be folded along respective fold lines to reconfigure the blank 400 from the unfolded configuration shown in FIG. 22 to a fully folded, functioning pannier of FIG. 25.

Figure 23:
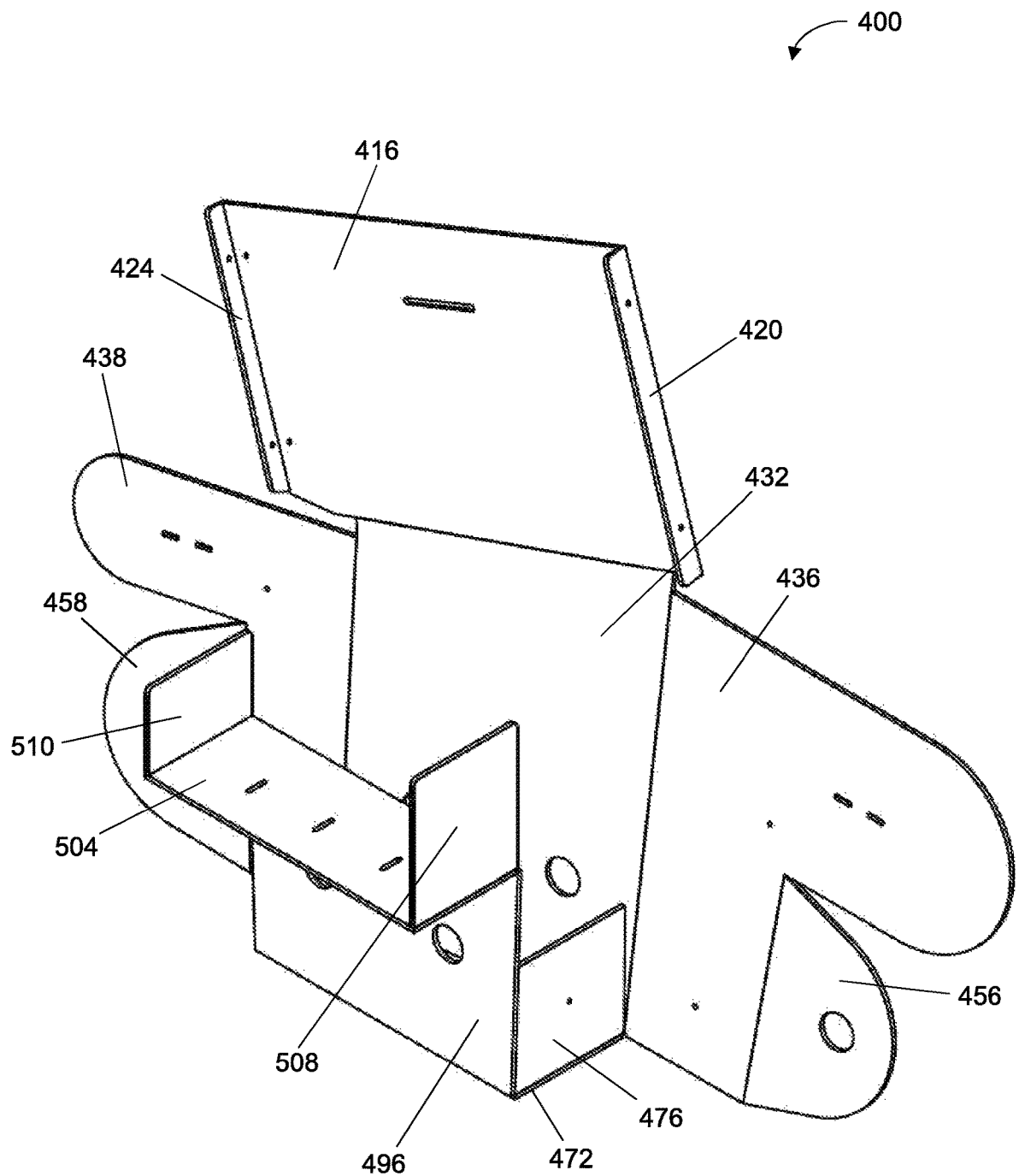
FIG. 23 is a perspective view of an exemplary pannier blank of the present disclosure in a partially folded configuration.
Figure 24:
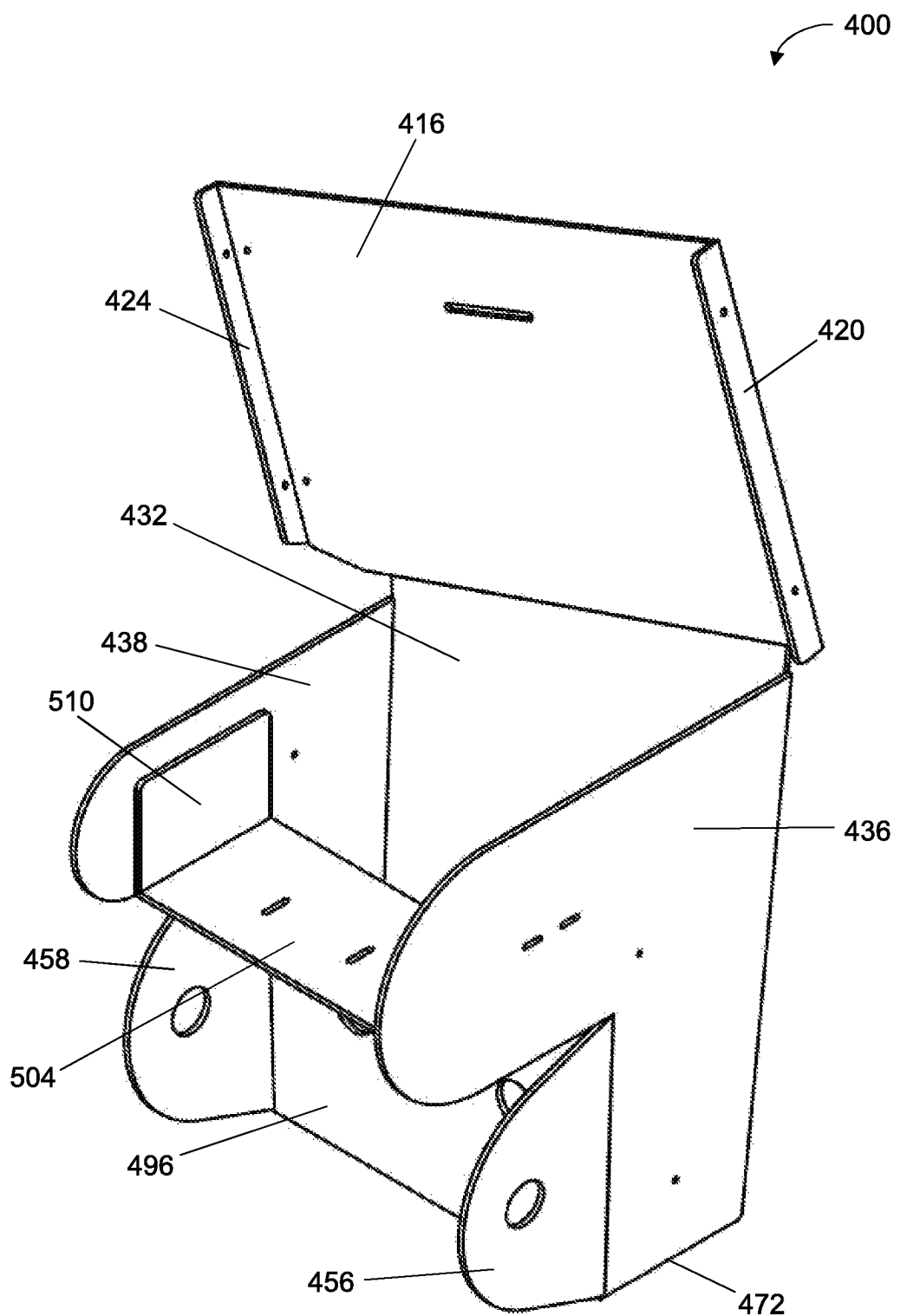
FIG. 24 is a perspective view of an exemplary pannier blank of the present disclosure in a partially folded configuration.
Figure 25:
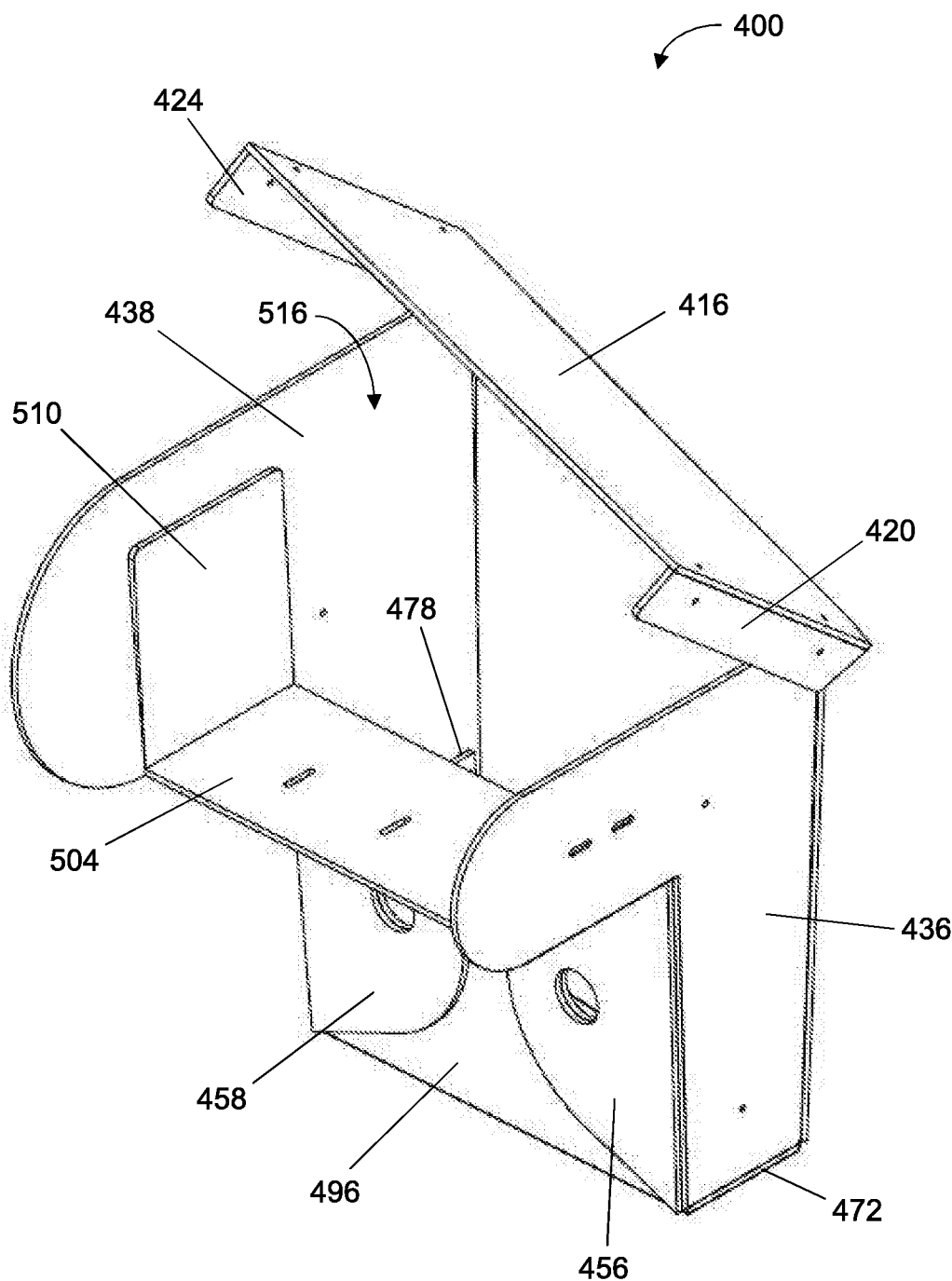
FIG. 25 is a perspective view of an exemplary pannier blank of the present disclosure in a folded configuration.

With reference to FIGS. 23-25, the pannier blank 400 is shown in partially and fully folded configurations. Although the discussion herein is regarding folding of a single blank 400, it should be understood that two blanks 400 can be similarly folded and subsequently engaged with each over (and/or with the bicycle rack) to form the pannier system. In some embodiments, a single folded blank 400 can be engaged with the bicycle rack and used without a second folded blank 400. For clarity, FIGS. 23-29 include reference numbers only for the sections, flaps and tabs discussed, and FIG. 22 includes reference numbers for all fold lines.

Initially, as shown in FIG. 23, the lateral tabs 476, 478 can be folded inwardly by approximately 90° towards the bottom section 472 to a position substantially perpendicular to the bottom section 472. Next, the lateral face section 432 can be folded counterclockwise along fold line 474 to be substantially perpendicular to the bottom section 472. The medial face section 496 can be folded inwardly along fold line 498 by approximately 90° towards the lateral face section 432 to be substantially perpendicular to the bottom section 472. With the medial face section 496 and the lateral face section 432 rotated towards each other, the openings 435, 437, 500, 502 can be substantially aligned such that during a subsequent step of assembly, wind tubes can be introduced through the respective openings 435, 437, 500, 502.

The rack tabs 508, 510 can be folded inwardly along fold lines 512, 514 towards each other and the rack face section 504 by approximately 90°. The rack face section 504 can be folded counterclockwise along fold line 506 by approximately 90° to be substantially perpendicular to the medial face section 496. The overhang sections 420, 424 can be folded inwardly along fold lines 422, 426 towards each other and the lid section 416 by about 90°. As noted above, in some embodiments, angle brackets can be coupled to the overhang sections 420, 424 and the lid section 416 to maintain the overhang sections 420, 424 in the folded configuration. Thus, when the lid section 416 is in the closed position of the folded pannier, the folded configuration of the overhang sections 420, 424 ensures that the contents of the pannier remain protected.

As shown in FIG. 24, the side arm face sections 436, 438 can be folded towards each other along fold lines 140, 142 to be positioned against respective lateral tabs 476, 478. The openings 484, 486 of the side arm face sections 436, 438 can be aligned with the openings 492, 494 of the lateral tabs 476, 478 for introduction of fasteners to couple the faces together. As shown in FIG. 25, the lateral flaps 456, 458 can be folded inwardly along fold lines 460, 462 towards each other such that the lateral flaps 456, 458 are positioned against the medial face section 496. The openings 468, 470 can be substantially aligned with the openings 500, 502 of the medial face section 496. The lid section 416 can be folded counterclockwise and inwardly along fold line 430 to cover the inner enclosure 516 formed by the walls of the folded blank 400. FIG. 25 shows the blank 400 in a fully folded, pannier configuration capable of receiving one or more items in the enclosure 516 formed by the folded sections, flaps and tabs, and the lid section 416 can be folded over the enclosure 516 to protect the contents within the enclosure 516.

Figure 26:
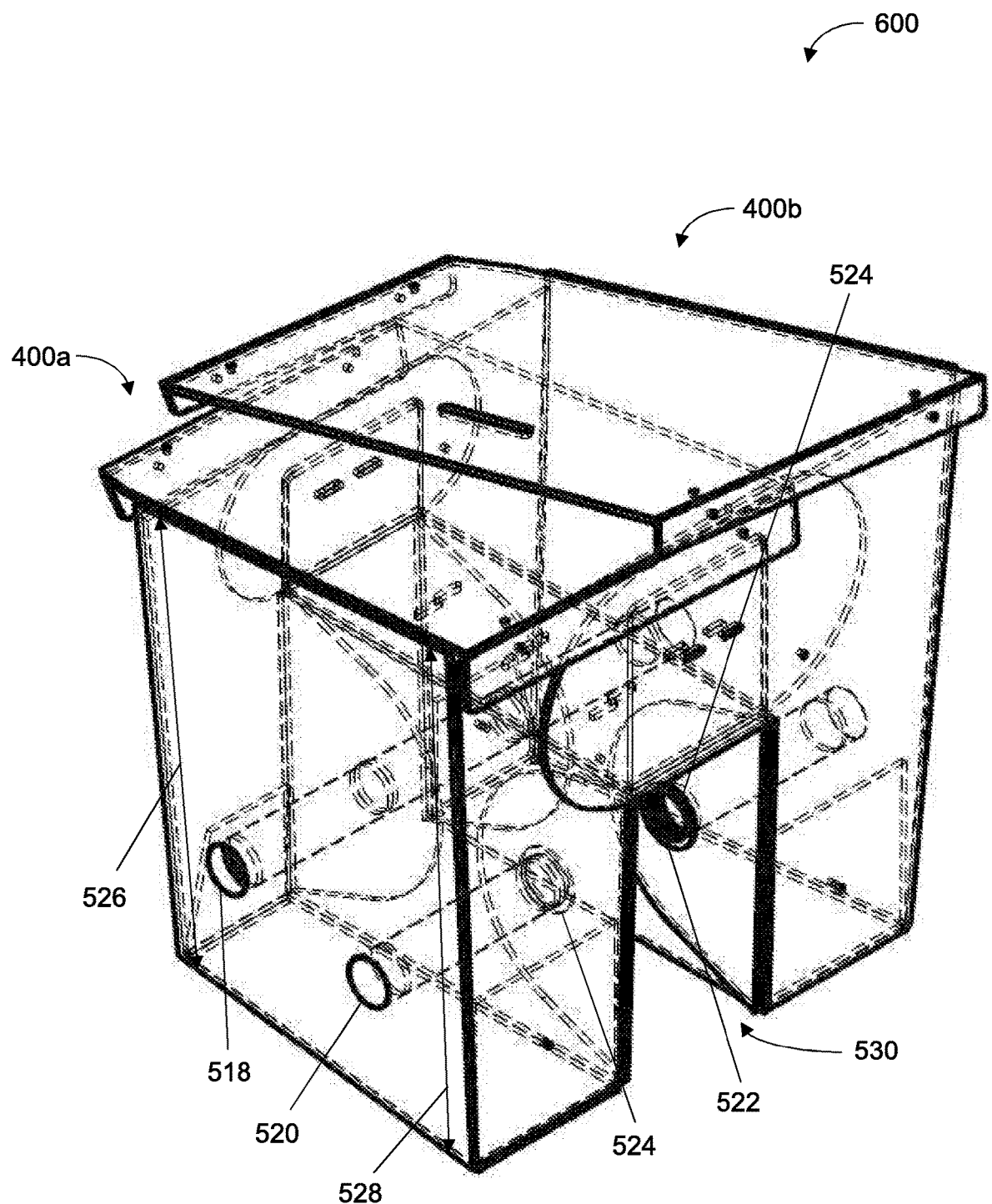
FIG. 26 is a perspective view of an exemplary pannier system of the present disclosure.

FIG. 26 shows a perspective view of an exemplary pannier system 600 including a first folded blank 400a and a second folded blank 400b coupled together and configured to fit over a front or rear rack of a bicycle. It should be understood that the blanks 400a, 400b can be coupled together in a substantially similar process to that described above regarding blanks 100a, 100b and FIGS. 13-19.

In some embodiments, wind tubes 518, 520, 522 can be incorporated into each of the blanks 400a, 400b by passage of the wind tubes 518-522 through respective openings 435, 437, 500, 502, 468, 470. Although three tubes 518-522 are shown, it should be understood that one or more tubes 518-522 could be used (e.g., only a single tube 518 extending the width of the pannier system, two tubes 520, 522 extending along the same axis, two similar tubes 520, 522 at least partially concentrically extending in place of the tube 518 of FIG. 26, four individual tubes, or the like). Each tube 518-522 can define a substantially cylindrical, elongated body having a uniform inner diameter along the length of the tube 518-522. In some embodiments, the tubes 518-522 can include a lip 524 defining diameter dimensioned greater than the diameter of the tubes 518-522. The lip 524 can be disposed against the outer surface of the respective flap or section, and ensures the position of the tube 518-522 is maintained.

Due to the angled components of the blank 400a, 400b, in the folded configuration, one end of the blank 400a, 400b has a height 526 that is dimensioned smaller than a height 528 at the opposing end. In some embodiments, each of the tubes 518-522 can extend from the lateral face section 432 to the medial face section 496 without passing through a gap 530 between the two blanks 400a, 400b. In such embodiments, individual tubes are used with each respective blank 400a, 400b. In some embodiments, one or more of the tubes 518-522 can be fixated to the outer surface of the blank 400a, 400b at the medial face section 496, extends through the enclosure 516, and extends out beyond the plane defined by the lateral face section 432 (see, e.g., tube 520 of FIG. 26). In some embodiments, a single lip 524 can be used to secure the tube 518-522 to the blank 400a, 400b. In some embodiments, lips 524 on opposing sides of the tube 518-522 can be used.

In some embodiments, the tube 518 extending near the end having the smaller height 526 can extend from the lateral face section 432 of one blank 400a to the lateral face section 432 of the second blank 400b, thereby extending through the gap 530 between the blanks 400a, 400b. In some embodiments, the tube 518 can be formed from two or more tubes forming a continuous structure (e.g., concentrically disposed tubes, tubes connected to each other at endpoints, or the like). In some embodiments, the tube 518 can be formed from a single, continuous tube. In some embodiments, the longer tube 518 can be secured to one lateral face section 432 with a lip 524, and the opposing end of the tube 518 can extend beyond the plane defined by the lateral face section 432 of the second blank 400b. In some embodiments, the tube 518 can be secured at both ends to the respective lateral face sections 432 using lips 524 without significantly extending beyond the plane defined by respective lateral face sections 432. It should be understood that the longer tube 518 extending between both blanks 400a, 400b can be used in instances where the tube 518 does not interfere with rotation of the wheel or other components of the bicycle. If the tube 518 is found to interfere with the wheel of the bicycle, shorter individual tubes 520, 522 can be used instead.

The tubes 518-522 can be used to both duct air through the pannier and to hold components of the blanks 400a, 400b together. Particularly, large panniers can act as a sail with strong crosswinds. The larger the pannier, the more likely crosswinds may affect the balance of the bicycle. The tubes 518-522 inserted through the panniers allow wind to blow through the pannier in one or more places to mitigate crosswind effect on the pannier system. In some embodiments, funnels (e.g., expanded diameters at the endpoints of the tubes) can be used to gather more wind.

As noted above, a continuous tube 518 can be used when there is no obstruction between the blanks 400a, 400b. The tube 518 can be buttressed against the bicycle rack and prevents the pannier system 600 from sliding under the seat of the bicycle. In some embodiments, T-joints can be used with the tube 518 to allow for attachment of a hitch or mounting surface to the pannier system 600. In some embodiments, charging wires can be passed from a solar panel (not shown) mounted to the lid section 416, through the tubes 518-522 and into the enclosure 516 by means of a rear located T-joint, with the energy storage element disposed within the enclosure 516.

In some embodiments, water bags (not shown) can be stored inside the enclosure 516 of the pannier system 600 and their contents can be accessed by means of a flexible hose. The flexible hose can be passed through a T-joint inside of the pannier system 600 and into one or more of the tubes 518-522. The hose end can be pulled out of the tube 518-522 and out of the pannier system 600 for washing or to fill bottles.

Figure 27:
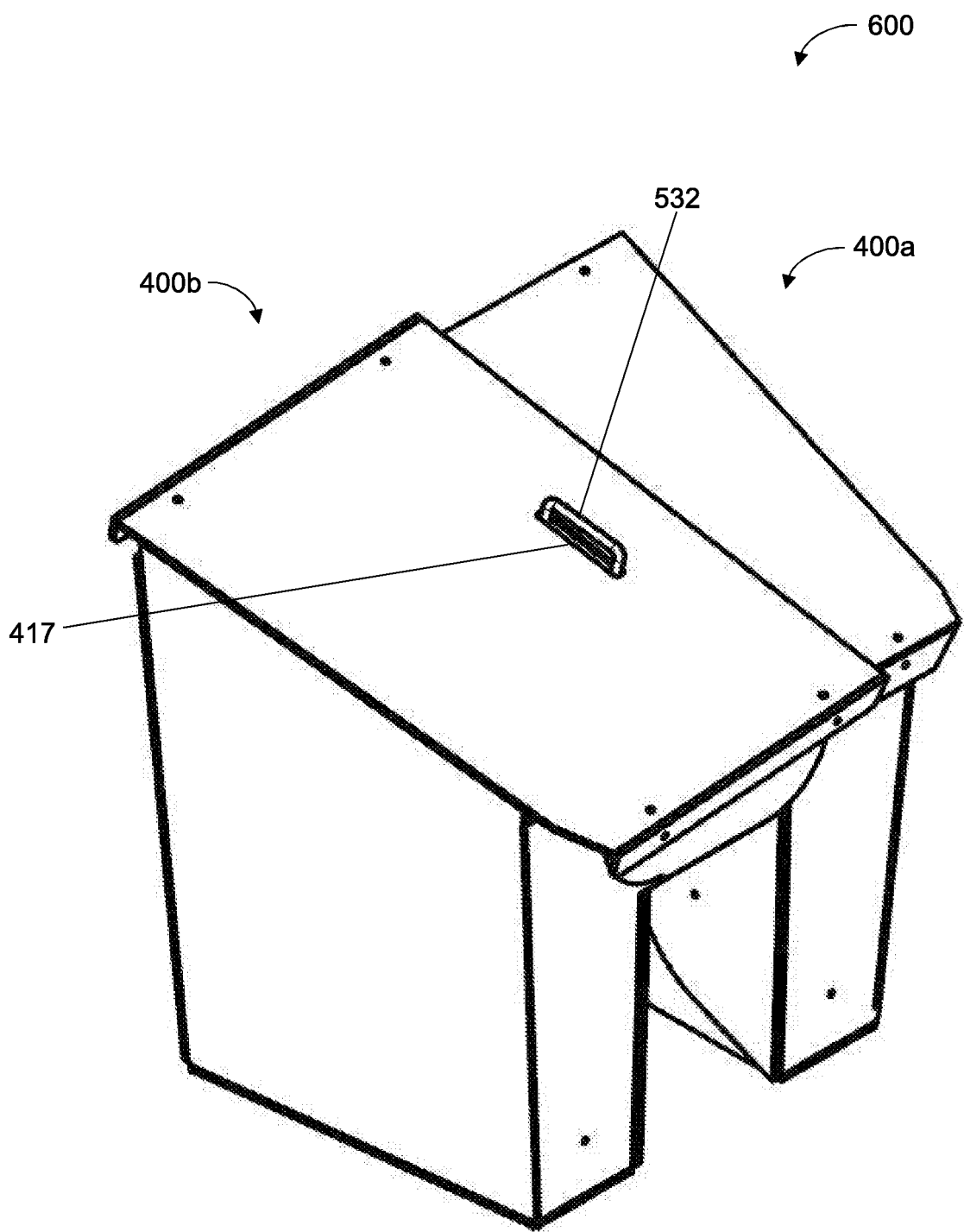
FIG. 27 is a perspective view of an exemplary pannier system of the present disclosure including a handle.

FIG. 27 shows a perspective view of the pannier system 600. In some embodiments, the blanks 400a, 400b can be formed without the openings 435, 437, 468, 470, 500, 502 such that the lateral face sections 432 and the medial face sections 496 define substantially uniform, uninterrupted sides (e.g., without openings). In such embodiments, tubes 518-522 are not used with the pannier system 600. One of the blanks 400a can include a handle 532 mounted to the outer surface of the lid section 416. The handle 532 can be passed through and engaged with the slot 417 of the blank 400b to assist in maintaining the lid sections 416 closed.

Figure 28:
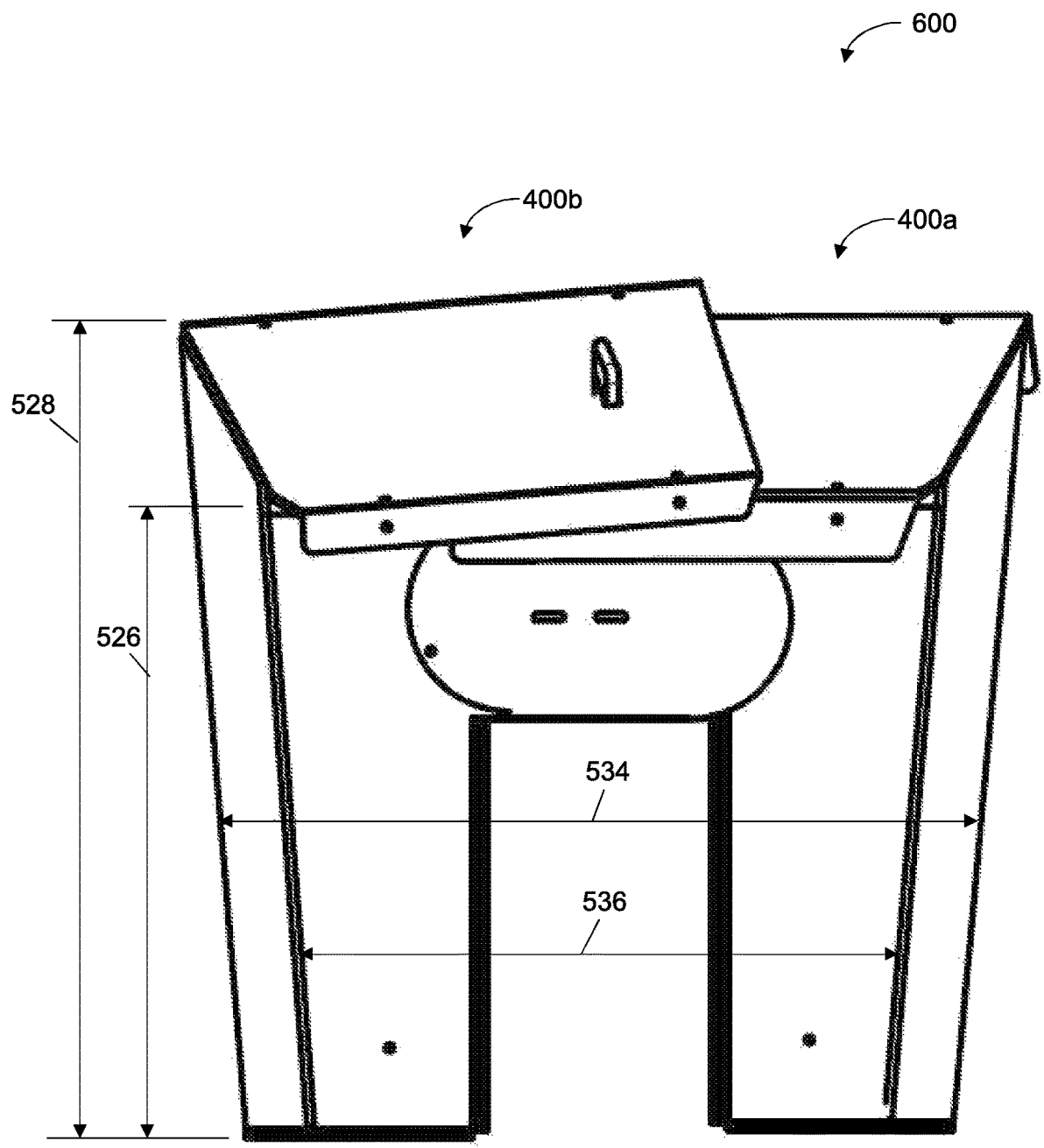
FIG. 28 is a front view of an exemplary pannier system of the present disclosure including a handle and tapered lateral and top sides.

FIG. 28 shows a perspective view of the pannier system 600. Although shown without tubes 518-522, it should be understood that the structure and relationships described herein apply to embodiments using the tubes 518-522. Due to the angled configuration of the fold lines of the blank 400a, 400b, the lateral face sections 432 taper from one end to the opposing end, resulting in a first height 526 and a second height 528 of different dimensions, and the lid sections 416 are angled or pitched downwardly towards the end having the first height 526.

The angled positioning of the lid sections 416 provides for greater aerodynamics of the pannier system 600 if the end of the pannier system 600 having the first height 526 is placed at the front of the bicycle (or placed at the rear of the bicycle). In some embodiments, the angle of the lid section 416 relative to horizontal can be from about 5° to about 60°. The angle of the lid sections 416 allows water to roll down and off the lid sections 416 instead of collecting on top of the lid section 416.

The angled configuration of the fold lines and the trapezoidal shape of the bottom section 472 result in lateral face sections 432 that taper inwardly towards each other and the side arm face section 438. The width 534 at one end of the pannier system 600 (e.g., at the height 528) is therefore dimensioned greater than the width 536 of the pannier system 600 at the opposing end (e.g., at the height 526). In some embodiments, the lateral face sections 432 can be angled, pitched or tapered from about 5° to about 60°. Such tapered configuration of both lateral face sections 432 provides for greater aerodynamics for the pannier system 600.

Figure 29:
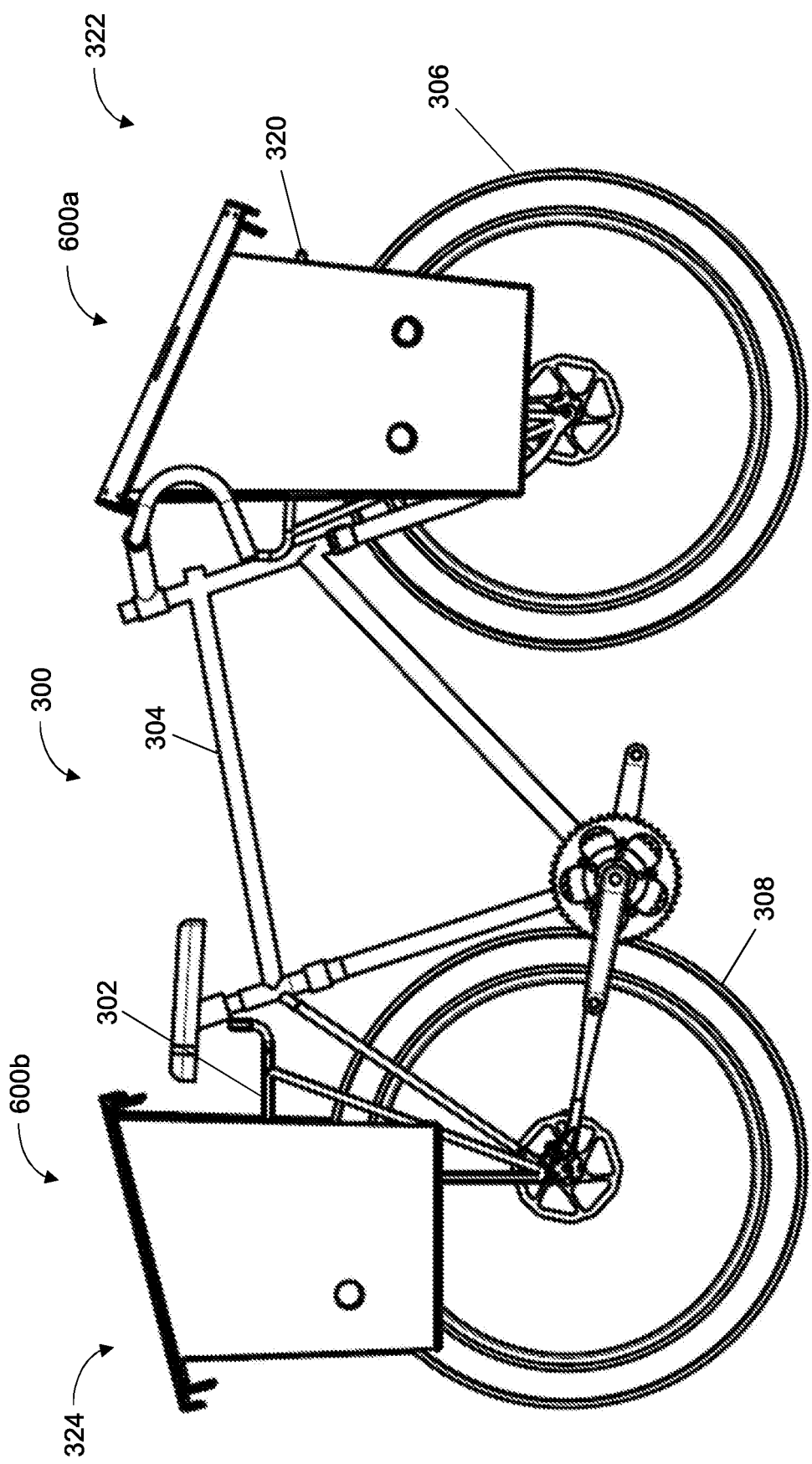
FIG. 29 is a side view of exemplary pannier systems of the present disclosure mounted on a front and rear of a bicycle.

FIG. 29 is a side view of exemplary pannier systems 600a, 600b mounted on opposing ends of a bicycle 300. The pannier system 600a can be mounted to a rack 320 at the proximal or front end 322 of the bicycle, and the pannier system 600b can be mounted to a rack 302 at the distal or rear end 324 of the bicycle. The pannier system 600a can be oriented such that the lid sections 416 and lateral face sections 432 taper downwardly towards the front end 322 for a greater aerodynamic effect. The pannier system 600b can be oriented such that the lid sections 416 and lateral face sections 432 taper downwardly towards the rear end 324 for greater aerodynamic effect.

In some embodiments, two or more tubes can be incorporated into the pannier system 600a, 600b. For example, pannier system 600a includes at least two tubes extending therethrough, while pannier system 600b includes one or two tubes extending along a single axis. The number of tubes used can vary depending on the wind conditions, interference from wheels 306, 308, and/or requirements for storage within the pannier systems 600a, 600b. The exemplary panniers and pannier systems discussed herein therefore provide for greater aerodynamics while also providing storage space on a bicycle.

While exemplary embodiments have been described herein, it is expressly noted that these embodiments should not be construed as limiting, but rather that additions and modifications to what is expressly described herein also are included within the scope of the present disclosure. Moreover, it is to be understood that the features of the various embodiments described herein are not mutually exclusive and can exist in various combinations and permutations, even if such combinations or permutations are not made express herein, without departing from the spirit and scope of the present disclosure.

The invention claimed is:

1. A blank, comprising:
 a bottom section that forms an item supporting surface when the blank is folded into a folded pannier configuration;
 a lateral face section hingedly connected with the bottom section at a first fold line;
 a central, vertical axis extending between proximal and distal ends of the blank; and
 a medial face section hingedly connected with the bottom section at a second fold line;
 wherein the blank is adapted to be folded from an unfolded blank configuration into a folded pannier configuration; and
 wherein in the unfolded blank configuration, opposing sides of the blank relative to the central, vertical axis are asymmetrical.

2. The blank of claim 1, comprising a lid section hingedly connected with the lateral face section at a third fold line.

3. The blank of claim 2, wherein the third fold line extends at a non-perpendicular angle relative to the central, vertical axis.

4. The blank of claim 3, wherein in the folded pannier configuration, the lid section is angled downwardly from one side to an opposing side of the pannier.

5. The blank of claim 4, wherein an angle of the lid section relative to horizontal is from about 5° and about 60°.

6. The blank of claim 1, wherein the first fold line extends at a non-perpendicular angle relative to the central, vertical axis.

7. The blank of claim 6, wherein in the folded pannier configuration, the lateral face section is angled such that a width of the pannier at one end is dimensioned greater than a width of the pannier at an opposing end.

8. The blank of claim 1, wherein the lateral face section and the medial face section each comprise an opening extending therethrough, the openings configured to align in the folded pannier configuration.

9. The blank of claim 8, comprising a tube extending through the openings between the lateral face section and the medial face section, the tube configured to mitigate crosswinds against the pannier.

10. The blank of claim 1, wherein in the unfolded blank configuration, the blank defines a flat and planar structure.

11. The blank of claim 1, comprising first and second arm face sections hingedly connected to the lateral face section at fourth and fifth fold lines, the fourth and fifth fold lines extending at an angle relative to the central, vertical axis.

12. A pannier, comprising:
 a bottom section that forms an item supporting surface of the pannier;
 a lateral face section hingedly connected with the bottom section at a first fold line;
 a medial face section hingedly connected with the bottom section at a second fold line;
 a lid section hingedly connected with the lateral face section at a third fold line; and
 a tube extending through openings between the lateral face section and the medial face section;
 wherein the lid section extends at an angle relative to the bottom face section.

13. The pannier of claim 12, wherein one end of the lateral face section defines a height dimensioned greater than a height at an opposing end of the lateral face section.

14. The pannier of claim 12, wherein the pannier is formed from a blank adapted to be unfolded from a folded pannier configuration into an unfolded blank configuration.

15. The pannier of claim 14, wherein in the unfolded blank configuration, opposing sides of the blank relative to a central, vertical axis are asymmetrical.

16. The pannier of claim 12, wherein the lateral face section tapers inwardly relative to the medial face section between one end of the pannier and an opposing end of the pannier.

17. The pannier of claim 12, wherein the tube is configured to mitigate crosswinds against the pannier.

18. The pannier of claim 12, comprising first and second arm face sections hingedly connected to the lateral face section at fourth and fifth fold lines, a surface area of the second arm face section dimensioned smaller than a surface area of the first arm face section.

19. A pannier system, comprising:
    a first pannier; and
    a second pannier engaged with the first pannier;
    wherein each of the first and second panniers comprises:
        a bottom section that forms an item supporting surface of the first and second panniers in a folded pannier configuration;
        a lateral face section hingedly connected with the bottom section at a first fold line; and
        a central, vertical axis extending between proximal and distal ends of the first and second panniers in an unfolded blank configuration;
    wherein in the unfolded blank configuration, opposing sides of the first and second panniers relative to the central, vertical axis are asymmetrical.

* * * * *